US012164551B2

(12) United States Patent
Kislal et al.

(10) Patent No.: US 12,164,551 B2
(45) Date of Patent: Dec. 10, 2024

(54) SUPERVISED SUMMARIZATION AND STRUCTURING OF UNSTRUCTURED DOCUMENTS

(71) Applicant: Pryon Incorporated, Raleigh, NC (US)

(72) Inventors: Ellen Eide Kislal, Leawood, KS (US); David Nahamoo, Great Neck, NY (US); Vaibhava Goel, Chappaqua, NY (US); Igor Roditis Jablokov, Raleigh, NC (US); Etienne Marcheret, White Plains, NY (US); Steven John Rennie, Yorktown Heights, NY (US)

(73) Assignee: Pryon Incorporated, Raleigh, NC (US)

( * ) Notice: Subject to any disclaimer, the term of this patent is extended or adjusted under 35 U.S.C. 154(b) by 0 days.

(21) Appl. No.: 18/219,189

(22) Filed: Jul. 7, 2023

(65) Prior Publication Data
US 2024/0012842 A1   Jan. 11, 2024

Related U.S. Application Data

(60) Provisional application No. 63/388,012, filed on Jul. 11, 2022.

(51) Int. Cl.
*G06F 16/34*   (2019.01)
*G06F 16/33*   (2019.01)
*G06F 16/35*   (2019.01)
*G06F 16/383*  (2019.01)

(52) U.S. Cl.
CPC ........ *G06F 16/345* (2019.01); *G06F 16/3347* (2019.01); *G06F 16/355* (2019.01); *G06F 16/383* (2019.01)

(58) Field of Classification Search
CPC .................................................. G06F 16/345
See application file for complete search history.

(56) References Cited

U.S. PATENT DOCUMENTS

| 2015/0347587 A1* | 12/2015 | Allen ............... G06F 16/9535 707/725 |
| 2017/0270159 A1* | 9/2017 | Wang ............... G06F 16/2425 |
| 2018/0260472 A1* | 9/2018 | Kelsey ............... G06F 40/56 |

(Continued)

FOREIGN PATENT DOCUMENTS

| JP | 2020080025 A | 5/2020 |
| KR | 10-2020-0064007 A | 6/2020 |

(Continued)

OTHER PUBLICATIONS

International Search Report and Written Opinion, PCT Application No. PCT/US2023/027053, mailed Oct. 24, 2023 (9 pages).

*Primary Examiner* — Van H Oberly
(74) *Attorney, Agent, or Firm* — Occhiuti & Rohlicek LLP

(57) ABSTRACT

Disclosed are methods, systems, devices, apparatus, media, and other implementations, including a method that includes obtaining a query set (e.g., a universal set of questions), performing a question-and-answer (Q-A) search on one or more documents using the query set to produce answer data responsive to one or more questions included in the query set, with the answer data characterizing concepts associated with the one or more documents, and deriving structured output information for the one or more documents based on the answer data produced in response to performing the Q-A search.

26 Claims, 5 Drawing Sheets

(56) References Cited

U.S. PATENT DOCUMENTS

2020/0097598 A1\* 3/2020 Anderson ......... G06F 18/23213
2020/0327155 A1\* 10/2020 Kim ..................... G06F 40/186
2021/0365500 A1\* 11/2021 Gunaselara ........... G06F 40/284

FOREIGN PATENT DOCUMENTS

| KR | 10-2021-0056071 A | 5/2021 |
| --- | --- | --- |
| KR | 102259390 B1 | 6/2021 |
| WO | 2020172155 A1 | 8/2020 |
| WO | 2021263138 A1 | 12/2021 |
| WO | 2023122051 A1 | 6/2023 |

\* cited by examiner

SUPERVISED SUMMARIZATION AND STRUCTURING OF UNSTRUCTURED DOCUMENTS

CROSS REFERENCE TO RELATED APPLICATIONS

This application claims the benefit of U.S. Provisional Application No. 63/388,012, entitled "Supervised Summarization and Structuring of Unstructured Documents," filed Jul. 11, 2022, the content of which is herein incorporated by reference in its entirety.

BACKGROUND

This invention relates to summarization and structuring of unstructured documents.

Computer users often have access to vast amounts of data, whether accessible through public networks (such as the Internet) or private networks, that the users can search to find answers and information to specific or general queries about some topic or issue. Often, it is up to the users to search for specific data that the user need, and to then compile the resultant output data into meaningful output documentation or reports. For example, financial analysts may need to compile daily financial reports with levels of details that may depend on how much information is available to the user from input data, and on previously determined answers for some initial inquiries. The effort of searching and compiling information can be substantial if the user needs to regularly update reports or to generate new or follow-up reports for new events. Making matters worse is the facts that most incoming sources of data may be unstructured (e.g., lack metadata, summary data, or any type of organizing information) so that the users may not even be aware that new data, relevant to the users' tasks and responsibilities is available.

SUMMARY

In a broad aspect, an approach to summarization and structuring of unstructured documents includes applying question-and-answer processing to the unstructured documents using a set of questions (a "query set") (that preferably encompasses questions pertaining to a large number of concepts or subject matter areas) applied to the unstructured documents to yield answer data responsive to the questions. This answer data characterizes concepts associated with the documents, and these concepts are used for further processing of the documents. For example, document classification, retrieval, and downstream processing may be based on these concepts.

The present disclosure is directed to guided, intelligent document processing via automatic question answering. Intelligent document processing includes generation of a structured representation of an unstructured document. The representation is some type of report such as a summary, a table, an alert, a trend analysis, or some other informative or actionable insight. The information that is to be included in a resulting report is often known a priori (for example, in a financial report the user would perhaps like to know on a daily basis the total value of the portfolio). In other instances, the content of a report is dependent on the user's personal interests. For example, someone who is interested in sports might like to have a news summary that includes recent scores, whereas someone who is interested in movies might like to know if new films have been released. The proposed framework described herein guides generation of a report (or the generation of some other type of output by one or more downstream processes in communication with the question answering system) for an arbitrary source document to include content that is important to the user, as determined based om answer data produced through the use of targeted questions submitted to a question answering system processing the arbitrary source document.

Under the proposed framework, a question-answering system, trained based on one or more language models (e.g., a Bidirectional Encoder Representations from Transformers (BERT) language model, a GPT3 language model, or any other types of language model transforms) are used to process unstructured documents with unknown content (whether an original source document, or an already transformed and searchable document) by applying a set of pre-determined questions (defining a universe of questions) to the documents. For example, the set of pre-determined questions may include a list of question relating to a large number of different concepts or subject matter areas. The question-and-answer system will return answer data to the submitted questions which will indicate (expressly or inferentially) the relevance of the content to the documents to the questions being asked. For example, if a returned answer for a particular pre-determined question (from the pre-determined library of questions) is associated with a low matching (relevance) score, that score indicates that a document(s) to which the pre-determined question was applied includes content likely unrelated to the particular question submitted. It can consequently be inferred that the document being processed has low relevance to concepts or subject matter associated with the particular question. On the other hand, a returned answer with a high match (relevance) score or with a high level of detail can indicate that the content is relevant to the question asked and consequently the subject matter or concepts of the document's content can be classified/determined. The classification of the content of the document can cause some downstream process (e.g., report generating process, metadata generating process) to be triggered, to produce resultant structured output, e.g., a report with output data arranged according to some associated format. For example, a particular document discussing financial performance of some particular company (e.g., an SEC report, a newspaper business article, etc.) can be identified, based on answer data response to financial related questions submitted through the question answering system of the proposed framework as a financial reporting document, and trigger downstream financial report summary process that analyzes the particular document and produces (in response to the initial questions and to pre-determined follow-up questions that are submitted in response to an initial classification of the particular document as a financial document) a report arranging the data in a particular format (e.g., placing in a first line the name of the company, in a second line that nature of the reporting, in a third line any monetary value (profits, losses, etc.) related to the document, and so on.

Accordingly, the framework described herein allow users to steer the result of automatic processing of a set of documents towards key insights of general interest and/or the user's personal interests. In the proposed solutions, an a priori a set of important questions is constructed to target the content for which associated output data is generated (according to particular downstream processes that may be invoked based, for example, on an initial classification of the content of the documents analyzed). The questions in the prior set of question may be personalized to the particular interests of the user. The questions are fed to an automatic question answering system to generate appropriate output data (a report, a classification, an alert, etc.)

Advantageously, the proposed approaches and solutions described herein can automatically identify and perform applicable processing for arbitrary unstructured documents to produce customized/specialized output (which may take into account specific needs or requirements of particular users) with little or no guidance or intervention from users. Thus, upon receipt of some arbitrary document, automatic classification can be performed through question answering processing, and specialized reporting and output generation can automatically produce required summaries, reports, or other types of output.

Thus, in some variations, a method is provided that includes obtaining a query set, performing a question-and-answer (Q-A) search on one or more documents using the query set to produce answer data responsive to one or more questions included in the query set, with the answer data characterizing concepts associated with the one or more documents, and deriving structured output information for the one or more documents based on the answer data produced in response to performing the Q-A search.

Embodiments of the method may include at least some of the features described in the present disclosure, including one or more of the following features.

Deriving the structured output information for the one or more documents may include one or more of, for example, determining classification information for the one or more documents representative of at least one of the concepts, performing data clustering for the one or more documents based on the answer data, applying a data discovery process to the answer data to determine one or more labels relevant to the one or more concepts associated with the one or more documents, generating an output report based on the answer data, and/or deriving supplemental data relevant to at least some of the answer data.

Deriving the supplemental data relevant to at least some of the answer data may include determining a supplemental concept related to the at least some of the answer data, accessing at least one of, for example, the one or more documents and/or another data source, and determining supplemental information related to the supplemental concept from the accessed at least one of the one or more documents or the other data source.

Determining the supplemental concept may include determining a supplemental question to apply to the at least one of the one or more documents or the other data source.

Generating the output report may include one or more of, for example, generating a summary report, provided to a user, based on at least some of the answer data, with the at least some of the answer data being arranged in one or more pre-defined templates, generating an alert communicated to the user, and/or populating a database table with at least some of the answer data.

Generating the output report may include determining scores for the answer data produced in response to performing the question-and-answer search using the query set, and including in the output report a pre-determined number, $N_1$, of answers, determined from the answer data, with highest scores.

The method may further include identifying from the answer data results additional answers whose respective scores exceed a pre-determined score threshold, and selecting from the additional answers whose respective scores exceed the pre-determined score threshold a maximum of $N_2-N_1$ selected answers for inclusion in the output report, wherein $N_2 > N_1$.

Generating the structured output information may include generating the structured output information based on the answer data, and further based on user information associated with a user.

The user information may include one or more of, for example, personal preferences of the user, network access control associated with the user, and/or network groups the user is associated with.

The method may further include determining additional queries based on at least some of the answer data, and performing an additional question-and-answer search for the one or more documents using the additional queries.

Determining the additional queries may include determining, using one or more ontologies defining relationships and associations between a concept identified from the at least some of the answer data, and different other concepts, and deriving additional questions for the additional queries based on the different other concepts determined using the one or more ontologies.

The method may further include determining scores for the answer data produced in response to performing the question-and-answer search using the query set. Generating the structured output information for the one or more documents may include generating the structured output information for the one or more documents based on the determined scores for the answer data.

The query set may include a universal set of a plurality of questions relating to a plurality of different content subject matter areas. Generating the structured output information may include determining the one or more documents is unrelated to one or more of the plurality of the different content subject matter areas based on the determined scores for the answer data produced in relation to questions, from the plurality of questions, relating to the one or more the plurality of the different content subject matter areas.

Determining the score for the answer data may include computing, for a particular answer responsive to a particular question from the one or more questions in the query set, a score representative of one or more of, for example, similarity of the particular answer to the particular question, similarity of a combination of the particular question and the particular answer to pre-determined question-answer pairs for the one or more documents, similarity of the particular answer to previously chosen answers provided to a particular user, relative location of the particular answer in the one or more documents, and/or a level of detail contained in the particular answer.

Generating the structured output information may include applying one or more machine learning models to at least some of the answer data.

Obtaining the query set may include adjusting a pre-determined set of questions based on user information associated with a user.

The user information may include one or more of, for example, personal preferences of the user, network access control associated with the user, and/or network groups the user is associated with.

The method may further include receiving one or more source documents, and converting the one or more source documents into the one or more documents on which the Q-A search is performed.

Converting the one or more source documents may include applying one or more segmentation pre-processes to the one or more source documents to produce one or more segmented documents, and applying to the one or more segmented documents one or more vector-transforms to transform the one or more segmented documents into vector answers in respective one or more vector spaces.

Applying the one or more vector-transforms may include transforming the one or more segmented documents according to one or more of, for example, a Bidirectional Encoder Representations from Transformers (BERT) language model, a GPT3 language model, a T5 language model, a BART language model, an RAG language model, an UniLM language model, a Megatron language model, a RoBERTa language model, an ELECTRA language model, an XLNet language model, and/or an Albert language model.

Deriving the structured output information may further be based on interactive data provided by a user.

The interactive data may include disambiguation data provided in response to prompt data generated by a Q-A system to select answers from multiple matches in the answer data related to one or more similar concepts.

In some variations, a system is provided that includes one or more memory storage devices to store executable computer instructions and data, and a processor-based controller electrically coupled to the one or more memory storage devices. The controller is configured to obtain a query set, perform a question-and-answer (Q-A) search on one or more documents using the query set to produce answer data responsive to one or more questions included in the query set, with the answer data characterizing concepts associated with the one or more documents, and derive structured output information for the one or more documents based on the answer data produced in response to performing the Q-A search.

In some variations, a non-transitory computer readable media is provided that is programmed with instructions, executable on one or more processors of a computing system, to obtain a query set, perform a question-and-answer (Q-A) search on one or more documents using the query set to produce answer data responsive to one or more questions included in the query set, with the answer data characterizing concepts associated with the one or more documents, and derive structured output information for the one or more documents based on the answer data produced in response to performing the Q-A search.

Embodiments of any of the above system and/or computer-readable media may include at least some of the features described in the present disclosure, including the above features of the method, and may be combined with any other embodiment or variation of the methods, systems, media, and other implementations described herein.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
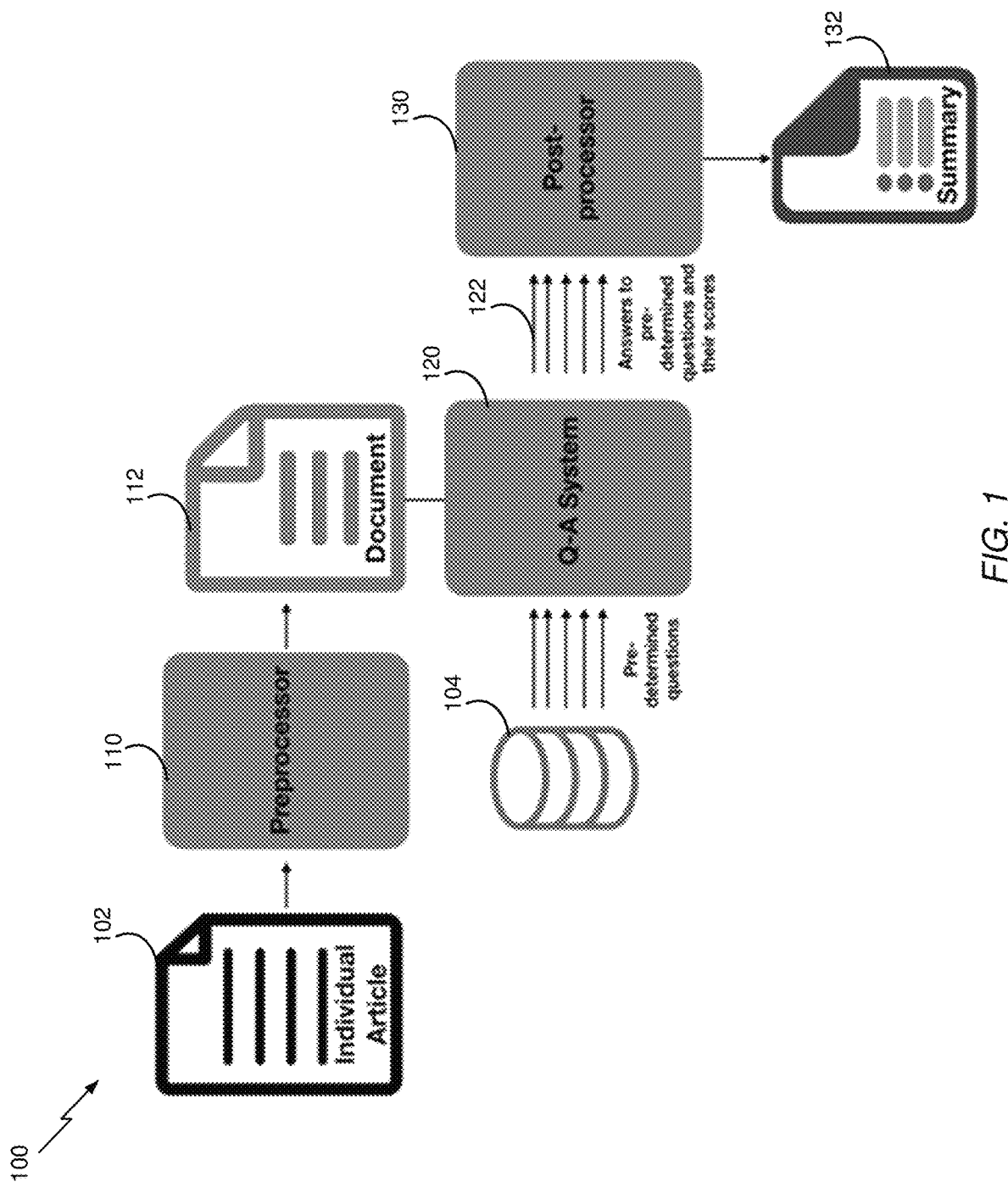
FIG. 1 is a diagram of an example system to perform unsupervised question-and-answer document processing.

Disclosed are implementations for a document processing system that can automatically process arbitrary unstructured documents (e.g., process the documents without necessarily having any a priori information about their content) to produce structured output (e.g., customized reports based on pre-determined templates or scripts, metadata, alerts, etc.) Generation of structured output is achieved at least in part by applying to an arbitrary unstructured document (which may have first been processed by a Q-A system to perform ingestion operations, as will be described in greater detail below, to transform the document into a searchable document) a set of questions preferably covering a range of topics, concepts, and subject matter areas (e.g., finance, business, sports, national defense and security, national and international news covering various news categories, etc.) The set (or library) of questions can be supplemented or customized based on identity of the specific user(s) on whose behalf the automatic initial Q-A iteration is performed to take into account previously determined areas of interest or specific information needs associated with the user(s).

The submission of the question set, covering a range of different topics, concepts, and subject matter areas, results in answer data that can be processed by downstream processes to produce structured data. For example, the answer data can be used to perform one or more of: i) classification processing (determine the nature of documents and what content is included in the documents, e.g., is a particular document a financial statement? Is it a medical chart? Is it a legal document like an NDA or contract? etc.), ii) data clustering processing, iii) data discovery processing to determine one or more labels relevant to the concepts associated with the documents, iv) generating output reports (which may be customized according to pre-determined, and optionally adjustable, templates), and/or v) deriving supplemental data relevant to at least some of the answer data (e.g., performing a multi-hop concept discovery in which additional data, not included within the content of the arbitrary document(s), is accessed from other sources to provide the receiving user with information the user would not have otherwise obtained if only the originating document(s) was available). Other types of downstream processing to generate other types of structured output may also be implemented.

Accordingly, in examples of the broad approach, a method to facilitate structuring of unstructured documents is provided that includes obtaining a query set (e.g., a library of questions that defines a universe of questions spanning a range of topic and concepts), performing a question-and-answer (Q-A) search on one or more documents (which may have been ingested to convert the one or more documents into respective one or more Q-A searchable documents) using the query set to produce answer data responsive to one or more questions included in the query set. The answer data produced through the performance of the Q-A search using the pre-determined query set characterizes concepts associated with the one or more documents (e.g., it is indicative of the concepts, topic, subject matter, the general nature, and other characteristics of the one or more documents). The one or more documents on which this universal Q-A search is performed are generally unstructured documents for which there may not be any a priori information on the nature of the one or more documents or their contents. The method further includes deriving/generating structured output information for the one or more documents based on the answer data produced in response to performing the question-and-answer search. In some embodiments, deriving the structured output information (through application of one or more downstream processes) may include one or more of, for example, determining classification information for the one or more documents representative of at least one of the concepts, performing data clustering for the one or more documents based on the answer data, applying a data discovery process to the answer data to determine one or more labels relevant to the concepts associated with the one or more documents, generating an output report based on the answer data, and/or deriving supplemental data relevant to at least some of the answer data.

The structured output information (be it classification information, metadata, output reports, alerts, control messages to updated databases, etc.) may be determined according to relevance/matching scores computed for returned answers to the questions. Such relevance scores may be computed, for example, based on distance measurements between semantic content of an answer and a corresponding question, based on output of a trained machine learning engine to assess relevance, etc. For example, one type of scoring process may be based a Transform-Based-Distance (TBD) between a question and an answer, or the posterior probability equivalent of the TBD. A particular question and answer pair with a high relevance score may be indicative that a particular document from which the question-answer pair was generated is related to a concept or topic associated with the particular question. Consequently, a particular downstream process to generate structured output for the identified concept/topic may be triggered. Thus, in such embodiments, the proposed framework may also be configured to determine scores for the answer data produced in response to performing the question-and-answer search using the query set, and to generate the structured output information for the one or more documents based on the determined scores for the answer data. As noted, the query set may include a universal set of a plurality of questions relating to a plurality of different content subject matter areas, and generating the structured output information may include determining the one or more documents is unrelated to one or more of the plurality of the different content subject matter areas based on the determined scores for the answer data produced in relation to questions relating to the one or more the plurality of the different content subject matter areas.

Further details regarding the proposed framework are now provided with reference to FIG. 1, showing a schematic diagram of an example system 100 for processing unstructured data using a question answering system (schematically depicted as Q-A system 120 in FIG. 1) to produce structured output. It should be noted that while some of the operations, functions, and/or processes discussed in the present disclosure are described as being applied to a particular document (e.g., a singular document), the operations can be performed simultaneously or sequentially on a collections of documents. As illustrated, a document 102, which may be a news article, a private report, or any type of document, and which, in a general case, may be received as an unstructured document with unknown content and without associated information (e.g., metadata) regarding its nature or its type, is obtained. It should be noted that in some situations at least some information may be known about the document (e.g., network location from which the document was transmitted, authorship information, and so on). However, for the purpose of illustration of the embodiments described herein, it will be assumed that at least some properties and attributes of the document 102 or its content are a priori unknown, thus rendering the document unstructured.

Preferably, before structured information can be extracted from the raw content of the unstructured source document 102, the document 102 is generally pre-processed by a preprocessor 110 to produce a resultant document 112 to which question answering processing may be applied via the Q-A system 120. The preprocessor 110 may be part of a document processing platform that includes the Q-A system 120 and communications interfaces (to allow interaction between various users and administrators, and the document processing platform), as will be discussed in greater detail below in relation to FIG. 3. The pre-processor 110 may be configured to, for example, perform intake processing operations, such as authentication and/or decryption of the data, format conversion (if needed), etc., transformation operations, including document segmentation and vectorization (parametrization) operations, and storage operations to store ingested documents in a repository of the system 100. For example, the segmentation operations may include dividing documents into portions (e.g., 200-word portions, or any other word-based segment), with the segmentation performed according to various rules for combining content from various parts of the documents into discrete segments. An example of a pre-processing (i.e., pre-transformation) rule is to construct segments using a sliding window of a fixed or variable length that combines one or more headings preceding the content captured by the sliding window, and thus creates a contextual association between one or more headings and the content captured by the window. Such a rule ensures that a subsequent language model transformation performed on a segment combines important contextual information with content located remotely (e.g., farther away in the source document) from the segment being processed.

Another pre-process that can optionally be applied during segmentation of the source document 102 relates to the handling of table information (i.e., when the original content is arranged in a table or grid). Such pre-processing is used expand structured data arranged in tables (or other types of data structures) into searchable form such as equivalent text. For example, upon identifying a portion of the source document 102 as being a multi-cell table, substitute portions are generated to replace the multi-cell table, with each of the multiple substitute portions including a respective sub-portion content data and contextual information associated with the multi-cell table.

Having performed segmentation-related pre-processing operations, the resultant segmented pre-processed document can be submitted to one or more transforms. The initial language model transformation processing is configured to reformat the document to contain each individual sentence as a potential answer to the questions. An example of a language model transformation that can be applied to the input content (which, as noted, may have first been preprocessed to decrypt and authenticate, and to partition the content into manageable chunks of data) is the Bidirectional Encoder Representations from Transformers (BERT) transform). Briefly, under the BERT approach a question and an answer are concatenated (tokenized for example using WordPiece embeddings, with suitable markers separating the question and the answer) and processed together in a self-attention-based network. The output of the network indicates a score for each possible starting position for an answer and a score for each possible ending position for the answer, with the overall score for a span of the answer being the sum of the corresponding start and end positions of the answer. That is, a self-attention method is used where embedded vectors of a paragraph and a query are mixed together through many layers followed by a decision-maker layer and segmenter logic to provide an efficient method to determine if a question is answerable by a paragraph, and if so, determine where exactly the span of the answer lies in the paragraph.

In the BERT-based approach, a network may first be trained on a masked language model task in which a word is omitted from the input, and predicted by the network by an output layer that provides a probability distribution over words of the vocabulary. Having trained the network on the masked language model task, the output layer is removed, and in the case of the question answering task, a layer is added to yield the start, end, and confidence outputs, and the network is further trained (e.g., fine-tuned, transfer learning) on supervised training data for the target domain (e.g., using Stanford Question Answering Dataset, or SQuAD). Having trained the network for question answering for the target domain, further training may be used to adapt the network to a new domain. Another training strategy used for BERT is the next-sentence prediction, in which the learning engine is trained to determine which of two input segments (e.g., such segments may be neighboring sentences of a text-source) is the first of the two segments. When training the model, both the masked-language and next-sentence training procedures may be combined by using an optimization procedure that seeks to minimize a combined loss function. Alternatively, or additionally, other training strategies (to achieve context recognition/understanding) may be used separately, or in conjunction with, one of the aforementioned training strategies for BERT.

In example embodiments based on the BERT approach, an implementation, referred to as a Two-Leg BERT approach, may be used in which much of the processing of a query is separated from the processing of parts of a document (e.g., paragraphs) in which answers to the query may be found. Generally, in the two-leg-BERT approach, the neural network architecture has two "legs," with one leg for processing the query, and one for processing the paragraph, and the outputs of the two legs are sequences of embeddings/encodings of the words of the query and the words of the paragraph. These sequences are passed to a question-answering network. A particular way this approach is used is to precompute the BERT embedding sequences for paragraphs, and complete the question-answering computation when the query is available. Advantageously, because much of the processing of the paragraphs is performed before a query is received, a response to a query may be computed with less delay as compared to using a network in which the query and each paragraph are concatenated in turn and processed together. The paragraphs are generally much longer than the queries (e.g., 200-300 words versus 6-10 words) and therefore the pre-processing is particularly effective. When successive queries are applied against the same paragraph, the overall amount of computation may be reduced because the output of the paragraph leg may be reused for each query. The low latency and reduced total computation can also be advantageous in a server-based solution. BERT-based processing of source documents produces transformed content that is typically stored in a repository (such as the DOM repository 340 of FIG. 3). The underlying documents from which the BERT-based transformed content is generated may be retained as well, and associated with the resultant transformed content (as well as associated with corresponding transformed content obtained via other transforms).

In some embodiments, the BERT-based transformers (e.g., used for the fast/coarse transformation, and/or for a fine-detail transformation) may be implemented according to encoder-based configuration. For example, a BERT-based transformer structure may include multiple stacked encoder cells, with the input encoder cell receiving and processing the entirety of an input sequence (e.g., a sentence). By processing the entirety of an input sentence, a BERT-based implementation can process and learn contextual relations between individual portions (e.g., words in the input sequence). An encoder layer may be realized with a one or more self-attention heads (e.g., configured to determine relationships between different portions, e.g., words in a sentence, of the input data), followed by a feedforward network. The outputs of different layers in an encoder implementation may be directed to normalization layers to properly configured resultant output for further processing by subsequent layers.

In some embodiments, other language models may be used (in addition to or instead of the BERT-based transform) to transform, as part of the pre-processing operations implemented by the pre-processor 110 of FIG. 1, source documents. Examples of such additional language model transforms include:

GPT3 language model—An autoregressive language model that is based on a transformer implementation.

T5 language model—a text-to-text transformer-based framework that predicts output text from input text fed to the model.

BART language model—a denoising autoencoder that uses a standard transformer architecture implemented with a Gaussian Error Linear Unit (GeLU) as its activation function elements, and that is trained by corrupting text with an arbitrary noising function, and uses a learning model to reconstruct the original text.

RAG language model—the Retrieval-Augmented Generation (RAG) language model combines pre-trained parametric and non-parametric memory for language generation.

UniLM language model—a unified language model framework that is pre-trained using three types of language model tasks, namely, unidirectional, bidirectional, and sequence-to-sequence prediction. The unified modeling is achieved by employing a shared transformer network and utilizing specific self-attention masks to control what context the prediction conditions on.

Megatron language model—a transformer framework with a large number of parameters.

RoBERTa language model—a model that is similar to the BERT approach, but with some of BERT's hyper-parameters optimized.

ELECTRA language model—this approach uses a generator unit to replace (and thus corrupt) tokens in the input data with plausible alternatives. A discriminator unit then tries to predict which tokens in the altered (corrupted) input were replaced by the generator unit.

XLNet language model—an autoregressive pretraining framework that uses contexts associated with text to predict neighboring text. The XLNet framework is configured to maximize the expected log likelihood of a sequence with respect to all possible permutations of the factorization order.

Albert language model—this model is similar to the BERT model, but with a smaller parameter size.

Other different language models, implementing different prediction and training schemes, may similarly be used in the implementation of the proposed framework of FIG. 1.

A source document that is pre-processed (e.g., having undergone various secured communication processing, including authentication and decryption, followed by segmentation and language model transformation) results in the searchable document 112 depicted in FIG. 1. Generally, the resultant document 112 is stored on a repository of pre-processed documents. For example, pre-processed documents produced by the pre-processor 110 are stored as document object model (DOM) objects in a repository that is configured to store and manage DOM records. Content of a DOM record typically depends on the transformation performed by the pre-processor 110. A DOM record can include data items associated with a particular source document or a source document portion. For example, one DOM record may be a collection of items that includes an original portion of a source document, metadata for that source document portion, contextual information associated with that source document portion, and/or vectors (also referred to as embeddings) resulting from one or more transformations applied to segments of the source content. A particular segment may be transformed by several different transformation (corresponding to different language models and/or to different resolutions or coarseness levels of the segments being transformed), and thus may be associated with several different vectors. Metadata associated with the transformed content may include contextual information associated with the original source content, and location information that indicates the location or position of a portion within the larger source document. Such location information can be provided in the form of pointer information pointing to a memory location (or memory offset location) where the source document is stored (e.g., so that when the pointer information is returned to a requesting user, it can be used to locate the memory location where the relevant content constituting an answer to the user's query can be found).

With continued reference to FIG. 1, the system 100 includes a database of questions (also referred to as a query set) 104 whose application to the document 112 through the Q-A system 120 produces answer data that can then be utilized by a post processor 130 to perform one or more downstream post-processing tasks such as generating specialize reports, generating alerts, performing data discovery tasks based on the answer data produced through the application of the query set to the pre-processed document 112, etc. As noted, an a priori set of questions is constructed (defining a library, or universe of questions) to identify target content (thus identifying structured information about an otherwise unstructured document with unknown, or not fully defined, content) on which post processing is to be performed depending on the identified type and nature of the document. In other words, the Q-A system is utilized to investigate/explore the nature of the document 112. The query set 104 typically includes a set of questions, which can be applied to the pre-processed document 112, covering a potentially large range of topics, concepts, and subject matter areas. For example, the query set can include questions directed to legal concepts, business concepts, social media trending concepts (be it sports, politics, and other au current concepts), specialized subject matter areas pertaining to science, engineering, and many other areas of knowledge.

The query set 104 can be intermittently adjusted (at regular or irregular intervals) to update the query set according to changing natures of various popular concepts (as may be determined according to social media trends). In some embodiments, the set of questions may be personalized or customized, either before or after the initial application of the query set 104, according to the identity of the user overseeing the processing, and/or according to other contextual information associated with the source document 102 including location where the source document 102 was originally stored, the location (e.g., geographic or network address) where query requests arrive from, identity of the entity on whose behalf the structured discovery processing is to be performed, network access control information (e.g., network access permissions) associated with the specific user or the larger group of users, etc. For example, if a source document, or a request to perform processing operations (such as the processing operations described herein) arrives from a legal service entity (e.g., law firm), the query set may be dynamically adjusted to include additional legal-related questions (e.g., questions pertaining to non-disclosure agreements, to leasing agreements, property transfer agreements, and so on).

As will be described in greater detail below, in some embodiments, the query set may be iteratively adjusted according to resultant answer data generated from application of the initial (or preceding) set of questions in the query set. For example, in response to application of the query set, answer data is generated which may be indicative (e.g., through relevance scores associated with text-based or parameterized representations of the answers to the applied initial set of questions) of the level of responsiveness/relevance of the content of the source document 102 or the resultant pre-processed (ingested) document 112 to the different questions in the initial query set. The answer data can thus be used to identify the more relevant concepts or subject matter areas that the document likely is related to, and to remove from further consideration concepts, topics, and subject matters areas that yielded answers with relatively poor relevance/matching score. Based on the answers that were deemed to be more relevant to questions in the query set, supplemental queries/questions can be determined that can be used to perform subsequent question-and-answer searches on the document 102 or 112.

For example, the framework described herein may generate additional questions as part of a question-augmentation procedure. The Q-A system 120 of FIG. 1 may have access to ontologies and synonym datasets to construct new questions that have a semantically similar meaning to questions that were deemed to be relevant to the concepts/topics of the document, or that are determined to be appropriate follow-up questions given the structured information discovered for the document 102 or 112 and/or contextual information associated with the user(s) and entity on whose behalf the initial, exploratory, question set was submitted. The determination of supplemental questions can be performed, for example, through rule-based processes, or through machine learning processes (e.g., to generate labels representative of supplemental or follow-up questions to previously-asked questions). The new question(s) are processes by the Q-A system 120 to produce additional answer data, and the process may repeat again (e.g., the generation of new question may continue for a fixed number of iterations, or until certain conditions, such as reaching a level of answer responsiveness associated with some specified confidence level, is met).

Thus, the proposed framework is configured to perform a question-and-answer (Q-A) search (e.g., by the Q-A system 120) on a document, such as the document 112, using an initial query set (such as the query set 104, which may have been compiled as a database of questions, and customized based on contextual data associated, for example, with the user submitting the query set) to produce answer data responsive to one or more questions included in the query set. As noted, in some embodiments, the proposed framework may further be configured to determine additional queries (in the form of additional questions) based on at least some of the answer data, and perform an additional question-and-answer search for the document 102 or 112 (and/or additional documents) using the additional queries (e.g., by submitting the additional queries to the Q-A system). To determine the additional queries, the proposed framework may be configured to determine, using one or more ontologies defining relationships and associations between a concept identified from the at least some of the answer data, and different other concepts, and derive additional questions for the additional queries based on the different other concepts determined using the one or more ontologies.

As discussed herein, the determined query set (and any subsequent, supplemental query set) submitted to the Q-A system is processed and applied to the pre-processed document 112 to derive structured output information based on answer data resulting from performing a Q-A search on the document 112 using the determined query set. More specifically, and as will further be discussed in relation to FIGS. 2 and 3 below, the Q-A system 120 is configured to transform the query data of the query set (i.e., the multiple questions covering a range of subject matter areas, concepts, and topics) into transformed query data compatible with the transformed source content (e.g., compatible with one or more of the transformed content records in the DOM repository). For example, if the pre-processed document 112 includes data representation compatible with BERT-based transformation data, the query set 104 is similarly processed to transform it to a BERT-based representation (e.g., to produce parameterized/vector representations of the questions comprising the query set). The Q-A system 120 launches a search process in which it identifies one or more candidate portions in the transformed content of the document 112 matching, according to one or more matching criteria, the transformed query data. For example, the matching operations may be based on some closeness or similarity criterion corresponding to some computed distance metric between, for example, a computed vector derived from transformation applied to the query data, and vector records comprising the document 112. In some embodiments, matching/relevance scores are derived to represent the relevance of each of the questions in the query set to the content of the document 112 (and thus to the content of the original source document 102).

The matching/search process applied to the query set and the document 112 produces answer data (that may optionally include relevance scores) that is indicative of the relevance of each question. In the example embodiments of FIG. 1, the answer data and corresponding scores are represented as data 122. The answer data 122 (whether provided in user-readable semantic form, or as a vector/parameter representation) represents structured information in relation to the document 112 or the document 102 since the matching process identifies the predetermined questions in the query set 104, associated with respective predetermined concepts or subject matter areas, for which answers with some relevance were found in the document 112. For those pre-determined questions in the query set that did not produce a possible matching answer, or produced an answer with a low matching/relevance score, it is assumed that the questions are not relevant to the document 112, and therefore the document 112 (or the document 102) is deemed to not be related to the concepts or subject matter areas associated with those unmatched or low-relevance questions.

As additionally illustrated in FIG. 1, upon producing the answer data 122 (with or without respective scores), structured output information is derived for the document 112 (and by extension for the source document 102) by applying one or more post-processing (i.e., post Q-A operation) processes, executing on the post-processor 130, to the answer data 122. In some embodiments, a particular downstream post-Q-A process may be automatically invoked or launched in response to the answer data indicating the content of the document 112 (or 102) is of a type (e.g., relating to a particular subject matter) for which a particular structured output generating process is to be performed. Consider, for example, a situation in which the Q-A processing applied to the document 112 determines that the content of the document 112 (and thus the source document 102) includes financial performance data for a particular company. Assume that the post processor 130, upon recognizing that the document 112 includes financial data, implements a data extraction process that generates a financial report summary to arrange portions of the answer data (produced by the Q-A system 120 in response to the universal query set 104) relating to the financial data. For example, the query set 104 may have included questions such as:

What is the name of the company?
What industry is the company active in in?
What was the daily change in the company's share price?
What caused the change?
What is the name of the company's CEO?
How many employees does it have?
Who are the major shareholders of the company?
. . . .

In the event that posing those questions yielded meaningful/relevant answers, the post processor 130 may determine that the document analyzed is a financial news item or report, and consequently may launch a process to prepare a financial report (e.g., according to some pre-determined template) that is provided to a user (such as a stockbroker, or a financial advisor) with an interest in the financial data contained in the document 102 or 112. In some embodiments, the report/summary (depicted in FIG. 1 as a summary document 132) may include fields requiring information that may not have been produced through application of the Q-A system 120 using the initial query set (e.g., because the query set did not include the specific questions corresponding to those missing report fields). In that event, the post processor 130 (implementing the particular financial reporting process) may interact with the Q-A system to submit additional questions, corresponding to any missing information, which are to be searched in either the document 112, or to be searched in other documents (maintained locally or remotely in one or more data repositories). Upon receiving such additional questions, the Q-A system may transform the questions into a representations compatible with the data representation of the document 112 (e.g., a vector representation and/or a semantic representation) and perform a search on the document 112, and/or on other documents that can be accessed (locally or remotely) via the Q-A system 120 to determine the missing information. In the financial report example, consider a situation where the report being generated by the post processor 130 includes a field for the age of the CEO. In this example, a question pertaining to the CEO's age may not have been included in the initial query set 104, and thus the financial report process may be configured to send a query request to the Q-A system 120 (or to some other searching platform with which the post processor 130 can communicate) to determine the age of the CEO identified for the company discussed in the document 112 (or the document 102).

In addition to compiling reports or summaries responsive to the identification of concepts and subject matter areas through Q-A processing of one or more unstructured documents using a universal list of questions, many other types of downstream processes may be implemented (e.g., on the post processor 130, or at some other local or remote computing node) following the Q-A processing. Some illustrative, non-exhaustive examples of such downstream post-Q-A-processing include document classification (with the classification used, for example, to trigger a report compilation process), data clustering processing, data discovery processing, generating alerts, generating database access requests to add data (determined from the resultant answer data) to a database, generating specialized documents based on the answer data (e.g., preparing various legal documents, such as non-disclosure agreements, contractual provisions, deeds, and so on) using information determined from the answer data when the Q-A processing indicates that such documents are required, and so. The various downstream processes can be implemented using machine learning models (e.g., for classification and data clustering processes), rules-based processes, or any type of algorithmic process to process or further analyze the answer data produced from the Q-A processing performed on the unstructured document 112 (or the document 102).

Figure 2:
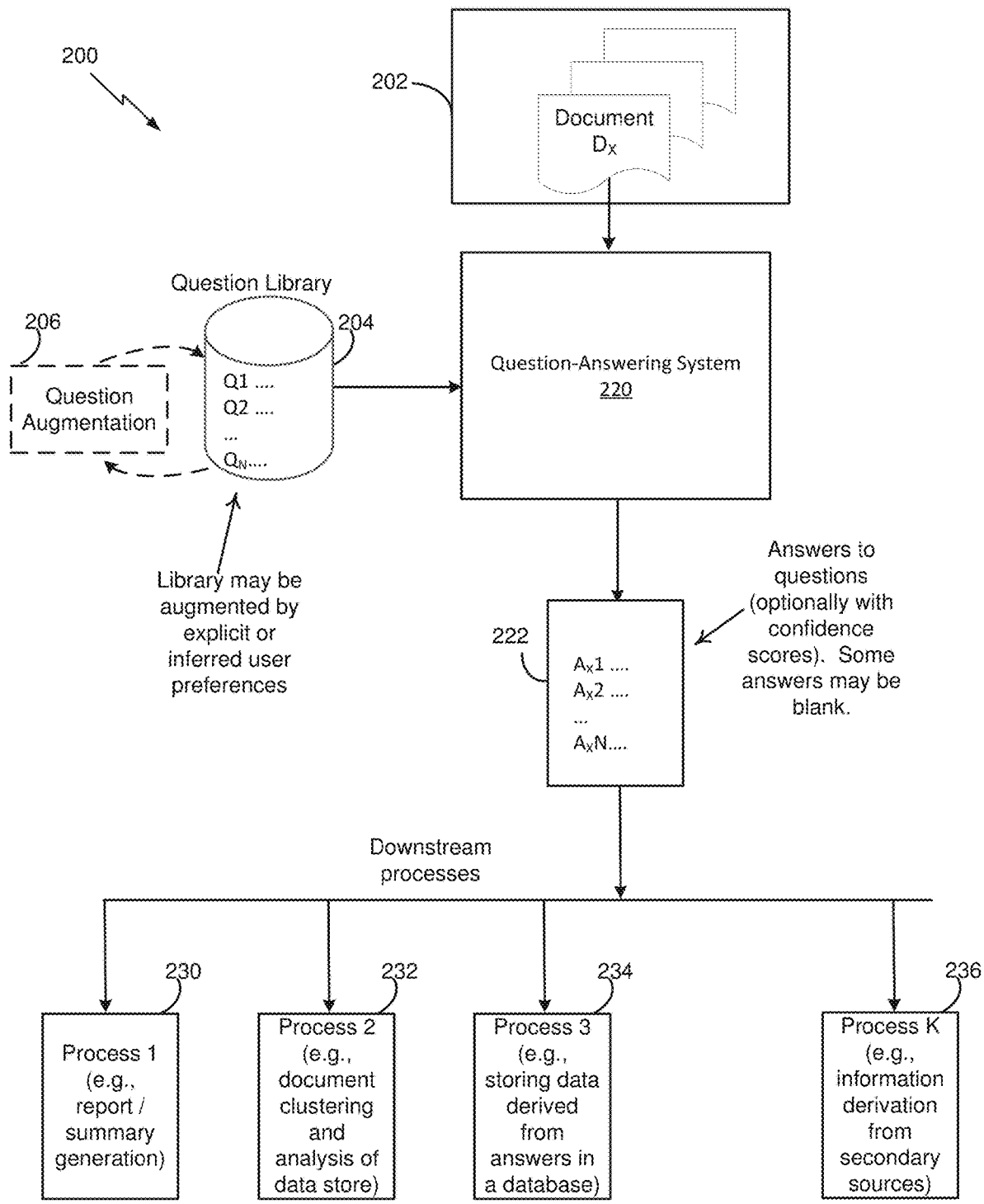
FIG. 2 is a diagram of another example system to perform unsupervised question-and-answer document processing.

More particularly, and with reference to FIG. 2, a schematic diagram of another example system 200 for processing unstructured documents using a Q-A system is shown. The system 200 may be similar, in its general configuration and operation, to the system 100 of FIG. 1. However, FIG. 2 provides more details regarding the downstream post-processing implementations, depicting multiple different processes that may be executed in response to the answer data produced by the Q-A system. Thus, the system 200 includes a repository 202 of documents which may include raw (unprocessed) documents, and at least some pre-processed documents (e.g., source documents that have undergone secured communication processing, initial formatting processing, and/or transformation into language model transform representations such as BERT). Documents that have undergone pre-processing may have been processed using a pre-processor module such as the pre-processor 110 of FIG. 1. One or more of the documents in the repository 202 are then provided to a question-answering (Q-A) system 220 which may be similar to the question-answering system 120 of FIG. 1. The Q-A system may be part of a document processing framework such as the one described in relation to FIG. 3. As will be discussed in greater detail below, such a framework can be implemented privately on local networks operated by individual entities (e.g., companies) and protected by a firewall from unauthorized remote access attempts, or alternatively may be implemented as a cloud server serving multiple entities that perform at least some of their document processing operations on the cloud server.

Whether operated locally or at the cloud server, a document $D_X$ is provided to the Q-A system 220 which applies to the document $D_X$ a query set comprising multiple questions covering multiple concepts, topics, and subject matter areas. For the purpose of illustration, reference is made to a single document $D_X$, although it will be understood that $D_X$ may be either a single document or multiple documents. As illustrated in FIG. 2, and as also discussed in relation to FIG. 1, the query set, maintained and/or retrieved from a library 204, can optionally be customized according to specific user preferences (as may be determined based on user ID, network location, and any other contextual information indicative of the users or group of users for which the document $D_X$ is to be analyzed), and the initial set of questions may thus be augmented (using an optional question augmentation process 206) through explicit or inferred user preferences. The question augmentation may be achieved through algorithmic processing and/or machine learning processing to identify potential additional questions that are relevant to the initial set of questions as informed by the user preferences.

Thus, a set of questions applied to a document $D_X$ includes questions $Q_1$-$Q_N$, resulting in answers $A_X1$-$A_XN$. Generally, there is no a priori knowledge about the content of the document $D_X$, and accordingly the use of a wide-ranging question set, spanning a potential large range of concepts, topics, and subject matter areas, allows the exploration and determination of the nature of the content of the document $D_X$, thus deriving structured information for the document $D_X$. For example, some of the questions that are applied to the document $D_X$ may result in no-answers (e.g., may return blank content), which would be indicative that some particular concepts or subject matter areas (corresponding to the particular questions that returned blanks) likely have no relevance to the document $D_X$. Other questions may results in answers whose level of completeness (e.g., as may be indicated by computation of a matching/relevance score) may vary. Generally, the more complete an answer is, or the higher that answer's relevance score is, the more likely that the document has subject matter overlap with the question(s) that resulted in that answer/score.

As further illustrated in FIG. 2, upon determination of a set of answers (with that set possibly including no-answers for some of the questions) and/or relevance score, the answers, the document $D_X$, and the questions that were included in the query set, are generally forwarded for downstream post-processing by performing one or more of the downstream processes 230-236 depicted in FIG. 2. Although only four processes are shown in FIG. 2, any number of the downstream processes may be available for downstream execution (such processes may be performed by a post-processor similar to the post-processor 130 of FIG. 1, with the post-processor being implemented on one or more local or distributed computing devices/nodes). Invocation of particular downstream processes may be done in direct response to identification of certain subject matter areas as a result of applying the query set 204. For example, if, as a result of asking questions that intend to ascertain whether the document $D_X$ may relate to a real estate or commercial transaction that requires preparation of corresponding documents or contracts, the Q-A system 220 produces answer data that indicates that the document $D_X$ does indeed pertain to such a transaction (as determined by the answers and/or scores associated with the questions meant to identify these types of transactions), a specific contract-generating application/process to generate the needed documents based on the content of the document $D_X$ may be executed.

As shown in FIG. 2, and as also discussed in relation to FIG. 1, some non-exhaustive examples of post-Q-A processes that may be launched in response to the generated answer data responsive to the questions asked include the following examples. Report generating process 230 (also identified as Process 1) is configured to generate a report or a summary (which may be similar to the report 132 of FIG. 1), optionally according to a customized template or format. In some embodiments, answer data (be it in semantic representation, vector representation, or some other representation) generated from applying the query set to the document $D_X$ is arranged in a summary report according to scores associated with the answers comprising the answer data (identified as process, and according to various rules for selecting and presenting the answer data. For example, after asking each of the pre-determined questions (and/or any augmented or customized questions) to yield answer data (be it actual semantic content, a vector representation, location information identifying a paragraph of a DOM object or a corresponding paragraph of the source document stored remotely, etc.) and/or obtaining respective scores, the best scoring answers to the pre-determined questions asked are outputted to the report. In a more particular illustration, if the summary to be generated needs to contain between $N_1$ and $N_2$ sentences, the top scoring $N_1$ answers are selected as the basis of the summary, and $(N_2-N_1)$ additional sentences may optionally be included in the summary if their score is greater than some threshold. Thus, in such embodiments, generating an output report (e.g., by the report generating process 230) may include determining scores for the answer data produced in response to performing the question-and-answer search using the query set, and including in the output report a pre-determined number, $N_1$, of answers, determined from the answer data, with highest scores. The report generating process may further include identifying from the answer data results additional answers whose respective scores exceed a pre-determined score threshold, and selecting from the additional answers whose respective scores exceed the pre-determined score threshold a maximum of $N_2-N_1$ selected answers for inclusion in the output report, with $N_2>N_1$. In the present example, computation of scores for the answers determined from the document $D_X$ may be based on distance measures such as the distance of an answer to the top of the document, the similarity of an answer to a previously chosen answer, and so on. In an example, the scores used for selecting the answers to be included in a report or summary may be computed based on a Transform-Based-Distance (TBD) scoring process between a question and the answer (or the posterior probability equivalent of the TBD), with that TBD (or posterior probability equivalent score) combined with various other heuristics such as the distance from the top of the document, the similarity to other answers, etc. For example, in an embodiment for a summary creation process, individual sentences are clustered in the document to a few centroids. For each answer to each question of the question set, the TBD score (or some other metric representative of the quality of the match) to all centroids is derived, and smallest TBD is included in a heuristic combination of "things" (variety of scores) used to determine the final score. For the heuristic combination process, additional score components can be introduced in some specified step order, and decisions/choices can made at different steps on how to combine such additional score components.

In another example embodiment, the report generated may formatted/configured according to a pre-determined template that presents content available in the document being analyzed (e.g., the document $D_X$) in a user-friendly and informative format. For example, upon determination that the document being analyzed is a current event news item, a resultant summary is generated that reproduces at least some of the questions that resulted in answer scores indicating high relevance of the document to a current event item, along with the corresponding answers to those questions (with the answers being presented in user-readable semantic form). Consider, for example, the following set of questions that would produce relevant answers if the document was related to a current event news item:

What happened?
What is the most-likely cause?
Who is doing this?
What are the consequences of this?
etc.

The above example can provide a generic analysis of any news item (covering arbitrary subject matter areas such as politics, international affairs, sports, finance, and so on). For an entity or a user who has a particular interest in a more specific subject area, the generic new items question set can be customized to make it more specific to that specific subject matter area. For example, for a user with an interest in finance, the above question set may be personalized to include:

What is the financial impact of this?
What is the cost of this?
Who is paying for this?
etc.

Alternatively, as noted, the query set may include more specific questions (in addition to, or instead of, the generic news item discovery questions) pertaining to the specific subject matter. Here too, not all the answers (and/or their corresponding questions) need to be produced in a report, but instead only the top $N_1$ scoring answers may be selected for the report, with additional optional answers (with lower scores) included in the report if those answers satisfy a minimum relevance score criterion.

In some embodiments, the report generating process 230 may be configured generate legal or administrative documentation based on information, such as entity names, relationships, agreed terms, etc., extracted through the Q-A process. Examples of legal or administrative documentation may include real estate documentation, transactional documentations (contracts), non-disclosure agreements, and so on. Alternatively, the Q-A system may be configured to recognize certain types of legal or administrative content, and to generate reports summarizing important information that can be gleaned from the analyzed documents (e.g., provide a summary of a transaction, including the name of transacting parties, the nature of the transaction, important terms of the transaction, and so on).

As further illustrated in FIG. 2, another example of a downstream process that can be applied to answer data generated by the Q-A system 220 through application of a universal set of questions to an arbitrary document (such as the document $D_X$) is a data mining process 232 (also identified as process 2) configured to perform, for example, data clustering and data store analysis based on the answer data. Data clustering processes may be implemented according to one or more clustering techniques that use information extracted by the Q-A system 220 to perform document-level clustering (e.g., to determine equivalent entity names contained in the document $D_X$), and/or datastore-level clustering, to identify relationships and/or associations (e.g., according to one or more similarity criteria) between the document $D_X$ (or portions of it) analyzed by the Q-A system 220, and other documents stored in local or remote data repositories. The clustering techniques implemented may include algorithmic clustering (e.g., that computes similarity or distance metrics between the data/content analyzed), machine learning clustering (based on a machine learning model trained to identify grouping relationships), rule-based clustering techniques, etc.

Another example downstream process that can be invoked in response to answer data resulting from applying a Q-A process to the document $D_X$ using the query set 204 is database management process 234 that is configured to update databases (or data repositories) with information extracted via the Q-A process. High scoring answers responsive to the various questions included in the query set 204 can be used to identify (possibly after performing an earlier reporting generating process or a data mining/clustering operation) databases/tables that need to be maintained (or created) in response to information contained in a newly received unstructured document.

Consider an example in which a report generating process is used to present questions and answer in the form of tables. This can be done, for examples, by adding a "header" field attached to each question. To generate a leadership table for a corporate document, the following questions may be included in the query set.

Who is the CEO?: CEONAME
What is the name of the CEO? CEONAME
What is the CEO's compensation?: CEOCOMP
Who is the CFO?: CFONAME
What is the CFO's compensation?: CFOCOMP Multiple questions with the same tag (CEONAME in the above example) are pruned so that only the top-scoring answer is retained for that tag. After all of the answers are retrieved, a table is formed. The table can be formatted as a CSV or TSV file to import into a spreadsheet, or to import into a relational database. In this example the header could be "Name, Role, Compensation" and a table in a relational database can be built using the following example commands:

INSERT INTO leadership (id, Name, Role, Compensation) VALUES(1,CEONAME,'CEO',CEOCOMP);
INSERT INTO leadership (id, Name, Role, Compensation) VALUES(2,CFONAME,'CFO',CFOCOMP);

Yet another example downstream process that may be implemented is a secondary source derivation process 236 (also identified as Process K) depicted in FIG. 2. In some example embodiments, the Q-A processing is used to determine, based on the completeness level of the answers and/or the relevance/matching scores computed for the answers, the general concepts and subject matter areas that a particular document ($D_X$) pertains to. However, it may happen that for some of the questions in the query set (including questions related to other questions that yielded relevant answers) no answer was generated, or that the answer generated has a low relevance score. If information corresponding to unanswered questions is required (to generate a report or summary), the system 200 (and more particular the post-processor of the system 200) is configured to launch a search for that information on a secondary source that may be available locally or remotely. This search may, in some examples, be submitted through the Q-A system 220 and applied to local documents (e.g., maintained in a repository of source documents and/or DOM documents) to determine the information that found to be unavailable from the document $D_X$ processed/analyzed by the Q-A system 220.

The example systems 100 and 200 for processing unstructured data using a question answering system can be implemented, in some embodiments, on a general data processing system adapted to perform specific or broad searches of documents. Thus, with reference to FIG. 3, a diagram of an example system 300 for document processing and response generation, which may be adapted to also derive structured output information, is provided. Further details regarding document processing implementations are provided in international application No. PCT/US2021/039145, entitled "DOCUMENT PROCESSING AND RESPONSE GENERATION SYSTEM," the content of which is hereby incorporated by reference in its entirety.

The system 300 is configured to ingest source documents (e.g., a customer's voluminous library of documents, or other repositories of data such as e-mail data, collaborative platform data, etc.), or to ingest newly created, incoming, documents (news items, etc.) to transform the documents to document objects (referred to as document object model, or DOM, documents) that represent a mapping from the source documents to searchable resultant objects (resultant transformed) documents. Those document objects may be stored in a DOM repository (also referred to as knowledge distillation, or KD, repository). A user associated with the customer that provided that document library (e.g., an employee of the customer) can subsequently submit a query (e.g., a natural language query) that is processed by the system 300, and, in situations where a quick answer is not otherwise available from a cache for commonly-asked-questions, the query is processed and transformed into a format compatible with the format of ingested documents to identify portions in one or more of the ingested documents that may contain the answer to the user's query. The system then returns, to the user, output data that includes for example, a pointer to a location within one or more of the source documents (corresponding to the identified one or more ingested documents) which the user can then access directly to retrieve an answer to the query. The output may alternatively, or additionally, include, in some embodiments, the answer to the user's query and/or a portion of a document, e.g., a paragraph, which contains the answer. Advantageously, the output returned to the user does not need to (although, in some examples, it may, if desired) include the specific information sought by the user, but rather just includes a pointer to a portion of source document stored in a secured site that cannot be accessed by parties not authorized to access that source document. This answer-determination approach therefore enhances the security features of transmitting sensitive information (e.g., confidential or private). As discussed herein, the system 300 may also be configured to automatically submit, e.g., via a query processing module 336, a set of pre-determined questions (spanning multiple subject matter areas and concepts) to produce answers with varying degrees of relevance and completeness indicative of the subject matter the content of a particular document being searched relates to.

In some embodiments, searching the document object repository to find an answer to a query typically includes two operations: (1) first, a process referred to as Fast-Search or Fast Match (FM) process is performed, and (2) the Fast-Match process is then followed by a process called Detailed-Search or Detailed-Match (DM) process (also referred to herein as "fine-detail" search). Both the FM and DM processes can be based on BERT (Bidirectional Encoder Representations from Transformers) models, or any of the other models described herein (e.g., UniLM, GPT3, RoBERTa, etc.) In the FM case, the model results (in some implementations) in, for example, one vector for a query and one vector for one paragraph (e.g., 200 words window, which may also include contextual data). In the DM, there are typically multiple vectors per query or per paragraph, in proportion to the number of, for example, words or sub-words, in the query or paragraph. Alternatively, the data processing platform represented by the system 300 may implement just a single language model transformation of a fixed variable semantic resolution.

In some embodiments, the transformations of the query and/or the source documents may be performed at a customer's network, with the transformed query and/or transformed content then communicated to a central server. Such embodiments can improve privacy and security for communicating sensitive data across networks since resultant vectors (derived through the transformation of content or query data) are created in the secure space of the customer (client), and consequently only the resultant transformed vectors (rather than the actual content or query data) are available or present at the centralized cloud server. The transformation of the content or query data at the client's device can act as a type of encryption applied to the data being transformed and will thus result in secure processing that protects the data from attacks on the server cloud. In some embodiments, the data being transformed at the client's network can additionally be encrypted to provide even further enhanced secured communication of the client's data (be it source data or query data).

Figure 3:
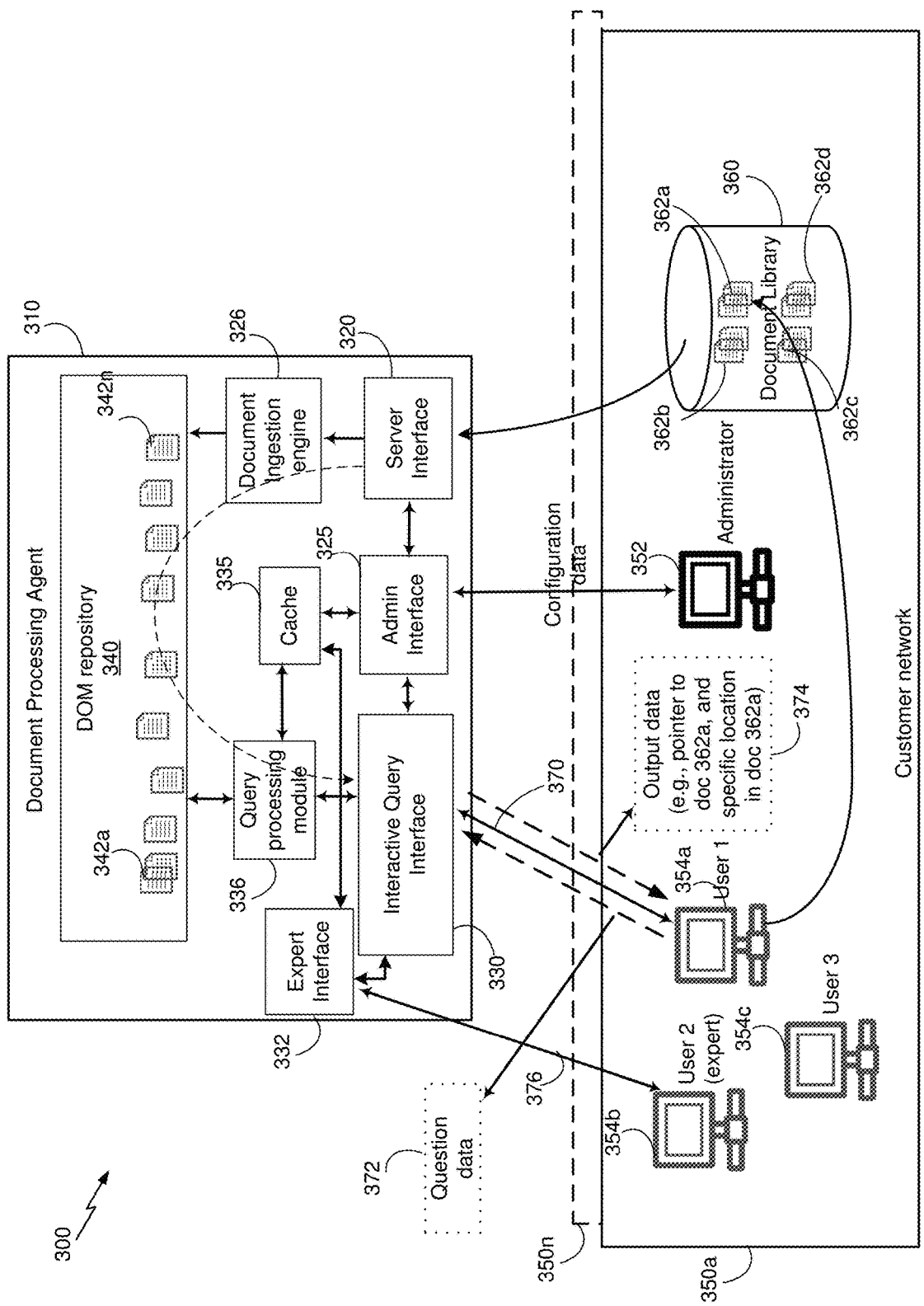
FIG. 3 is a schematic diagram of a document processing framework.

As depicted in FIG. 3, the system 300 typically includes a document processing agent 310 (which may be an AI-based agent) in communication with a customer's network 350*a* (which is one of n customer networks/systems that access, in the example system 300, the document processing agent 310). The document processing agent 310 can be implemented as an independent remote server that serves multiple customers like the customer systems 350*a* and 350*n*, and can communicate with such customers via network communications (be it private or public networks, such as the Internet). Communication with customers' units is realized via a communication unit comprising one or more communication interfaces (such as a server interface 320, an admin interface 325, an interactive user interface 330, and/or expert interface 332, all of which are represented schematically in FIG. 3), which would generally include communication modules (e.g., transceivers for wired network communications and/or for wireless network communication, with such transceivers configured according to various appropriate types of communication protocols). Alternatively, the document processing agent 310 does not need to be located at a remote location, but may be a dedicated node within the customer network (for example, it can be implemented as a process running on one of the customer's one or more processor-based devices, or may be a logical remote node implemented on the same computing device as a logical local node; it is to be noted that the term "remote device" can refer to the customer station, while "local device" can refer to the document processing agent 310, or vice versa). An arrangement where the agent 310 executes out of the customer's network (such as any of the customer networks 350*a*-*n*) may improve data security, but may be more expensive to privately run.

Yet in other alternative embodiments, some portions of the system (e.g., the ingestion units configured to perform the pre-processing and vectorization/parametrization operations on source documents and/or on queries submitted by users) may be located inside the firewall of a customer's network, while storage of ingested document (and optionally search engines to search ingested content) may be located outside the customer's network's firewall (e.g., on a centralized cloud server(s)). In such alternative embodiments, data sent to the cloud servers (e.g., to perform the search at a centralized location) may already have been processed into encoded (ingested) content (e.g., through vector processing that may have been implemented through coarse transform, e.g., applied to fixed sized input segments, and/or fine-detail numerical transforms applied to smaller portions than the portions processed by the coarse transformer) that is unintelligible to third parties unauthorized to make use of the data, thus adding another measure of privacy and security protection to data that is to be processed using the system 300. In these alternative embodiments, the initial part of the processing of the input query may also be processed inside the customer network's firewall. In addition to performing the transformation (of the source content and/or the query) within a client's firewall, such transformed data may further be encrypted (using symmetric or asymmetric encryption keys) before being transmitted to the document processing agent 310, thus increasing the level of security/privacy realized for communications between a customer's network and the centralized document processing agent (which serves multiple customers).

The example customer network 350*a* may be a distributed set of stations, potentially with a dedicated secured gateway (protected by a firewall and/or other security measures) that can be controlled (from a station 352) by an administrator. In one example, the customer generally has amassed a large volume of electronic documents, including, e.g., technical documentation relevant to the customer's operations, administrative documents such as Human Resource documents, and all other types of written documents in electronic form. The documents are arranged in a document library 360 (which may be part of the computing of the customer network 350*a*), and are accessible by various authorized users at user stations 354*a*-*c* within the network 350*a*, and by an administrator (via an administrator station 354). Any number of stations may be deployed in any particular customer network/system. The administrator station 352 can control access to the documents in the library 360 by controlling privileges, and otherwise managing the documents (e.g., access to specific documents within the library 360, management of content to conceal portions that do not comply with privacy requirements, etc.)

In addition to the library 360 (containing documents relating to operation of the entity operating on the network), other sources of data or information may be available from various applications employed by the customer (e.g., an e-mail application, a chat application such as Slack, customer relationship applications such as Salesforce, etc.) to process through the document processing implementations described herein. In yet additional embodiments, documents may be sent to the document processing agent 310 from third party data providers (e.g., financial service providers, news services, and so on) so that content (possibly unstructured data) stored in those providers document repositories can be processed to generate meaningful structured output information that can be provided to one or more of the customers associated with the networks 350*a*-*n*.

The administrator station 352 is configured to communicate with the document processing agent 310 via, for example, an admin interface 325. Among other functions, the administrator can provide the document processing agent 310 with information identifying location of the source document in the repository (library) 360 maintaining the plurality of source documents, locations of third party document repositories that the customer wishes to monitor and process, control configuration and operation of the functionality of the document processing agent 310 in relation to the customer network 350*a*, review data produced by the agent 310 (e.g., override certain answers), provide the document processing agent 310 with training data, etc. Communication between the station 352 and the admin interface 325 can be established based on any communication technology or protocol. To enhance security features, communications between the document processing agent 310 and the administrator station 352 may include authentication and/or encryption data (e.g., using symmetric or non-symmetric encryption keys provided to the document processing agent 310 and the administrator station 352). Using the communication link established between the administrator station 352 and the interfaces 320 and 325, the administrator provides information necessary for the document processing agent 310 to access the document library. For example, the administrator station can send a message providing the document processing agent 310 with a network address for the document library 360 (and/or identity of documents within that library that the agent 110 is to access and process), or providing location information (e.g., network addresses) of individual documents (or third party repositories with multiple documents) whose content is to be processed. The administrator station can, in turn, receive an encryption key (e.g., a private symmetric key, or a public key corresponding to a private asymmetric key used by the agent 310) that is to be used to encrypt content of documents that are to be transferred to the agent 310. The communication between the administrator station 352 and the admin interface 325 (or any of the other interfaces, such as interfaces 320 and 330, with which the administrator can communicate) can also be used to establish other configuration settings controlling the exchanges of data and information between the customer network 350a and the document processing agent 310.

Once the document processing agent has been provided with the location (e.g., represented as a network address) of the document library 360 or of some other source document, the agent 310 can begin receiving data transmissions of the documents to be processed. The administrator station 352 can control the content sent, and perform some pre-transmission processing on the documents to be sent to the document processing agent 310, including removing sensitive content (e.g., private details), encrypting the content (e.g., using a public key corresponding to a private key at the document processing agent 310), authenticating the data to be transmitted, etc. The document processing agent 310 receives data transmitted from the customer network 350a via the server interface 320, and performs data pre-processing on the received data, including authentication and/or decryption of the data, format conversion (if needed), etc. The server interface 320 then passes the data corresponding to the documents sent (subject to any pre-processing performed by the interface 320, which may include at least some of the pre-processing performed by the pre-processor 110 of FIG. 1) to a document ingestion engine 326 that processes the received documents to transform (convert) them into a representation that allows the determination and generation of answers to queries provided by a user of the network 350a, or the determination and generation of answers to queries for another source (including, for example, an unstructured document to be analyzed using a query set with a universal set of questions). Typically, prior to applying the transformation(s), the source document undergoes pre-processing such as being segmented into portions (e.g., 200-word portions, or any other word-based segment), with the segmentation performed according to various rules for adjoining content from various parts of the documents into discrete segments. As noted, an example of a pre-processing (i.e., pre-transformation) rule is to construct segments using a sliding window of a fixed or variable length that combines one or more headings preceding the content captured by the sliding window, and thus creates a contextual association between one or more headings and the content captured by the window. Such a rule ensures that the transformation performed on a segment combines important contextual information with content located remotely (e.g., farther away in the source document) from the segment being processed.

Having segmented the source document, and/or or performed other types of pre-processing (such as those described above in relation to the pre-processor 110), the document ingestion engine 326 is configured to apply one or more types of transformations to the document segments to transform the segments into searchable segments (e.g., question-and-answer searchable segments). As noted, one type of transformation that can be applied to the segment is based on transforming the fixed-sized (or substantially fixed-sized) segments, typically comprising multiple words/tokens, into numerical vectors in order to implement a fast-search process. Such a search is typically a coarse search, in that it generally returns (in response to a query submitted by a user) a relatively high number of results (hits) because the search is based on matching vectors produced from input data comprising a relatively large number of words (tokens or features), and as a result the resolution achievable from such a transformation is lower than what can be achieved from transforming smaller segments. Thus, results based on coarse vector transformations might not provide as accurate representations of the textual meaning of the transformed content as other transformations applied on smaller segments. A fast-search can be performed relatively quickly, and thus may be used to winnow the possible candidates of possible answers (to the submitted query) to a size or number that can then be more carefully searched (possibly through a search based on another type of transformation). Another transformation that may be applied by the ingestion engine is one for generating fine-detail vector transformations that are used to more narrowly pin-point locations of answers with some text-segment (e.g., paragraphs) specific answer word sequences. Generally, document segments on which the fine-detail transformations are applied may be at a finer grain (resolution) than fast-search segments (which are generally of a fixed size, e.g., 200 words, and thus cannot typically pinpoint the exact location of an answer, if one exists, within the segment). Either of the above types of transformations (to implement a fine or coarse search) may be implemented using one or more types of language model transforms, including BERT, GPT3, UniLM, and others.

For the fine-detail transformation performed by the document ingestion engine 326, the source data (e.g., text-based portions segmented from a source document according to one or more rules or criteria, with the segmented portions typically being smaller in size than the source segments used for the fast-search transformation) is typically transformed into multiple vectorized (numerical/parametrized) transformed content. The fine-detail transform may also be implemented according to any of the language model transforms described herein (including BERT). The processing by the document ingestion engine 326 can include natural language pre-processing that determines at least some linguistically based information, such as detection and recording of locations of named entities (e.g., person and company names) in the document, expansion of structured data, such as tables, into searchable form of equivalent text, information conversion into knowledge representations (such as a predefined frame structure), extraction of semantic meaning, etc. In some embodiments, the resultant fine-detail transformed data may be combined with the original content that is being transformed, along with derived or provided metadata (although such metadata is not critical, it can facilitate the performance of intelligent searching and question answering for a document). In some examples, the combination of the transformed content and the source segment can be further augmented with automatic questions that may be germane to the source segment, so that these generated questions are combined with the particular segment (or in a particular location in a full document that includes the entirety of the source content and the corresponding transformed content), or with a particular information field. When processing questions from a user, a similarity between the user's question and such automatically generated questions can be used to answer the user's question by returning the output information (e.g., a pointer or actual user-understandable content).

With continued reference to FIG. 3, ingested content produced by the document ingestion engine 326 is stored in document object model (DOM) repository 340. The repository 340 is typically implemented on one or more data storage devices (distributed, or available at a single local location) that can be accessible from multiple access/interfacing points between the repository 340 and other modules/units of the document processing agent 310. In the diagram of FIG. 3, the repository 340 is depicted as having two access points, with one access point being a one-directional link between the ingestion engine 326 and the repository 340 (i.e., a link to allow writing content from the engine 326 into the DOM repository 340) and a bi-directional access point connected to a query processing module 336 that provides query data to the DOM repository 340 (in order to search the DOM records stored in the repository) and receives search results that are forwarded to the user (optionally after some further processing, such as arranging retrieved content in a pre-determined report content) that submitted the query. In some embodiments, the access point to the repository can be implemented as a single point connected to a module configured to perform the query processing and the document ingestion operations.

The DOM repository 340 (which may be implemented similarly to the repository 202 of FIG. 2) is configured to (in conjunction with the document ingestion engine 326 and/or the query processing module 336) store, manage, and search DOM records 342a-n. Content of a DOM record typically depends on the transformation performed by document ingestion engine 326. A DOM record can include data items associated with a particular source document or a source document portion. For example, one DOM record may be a collection of items that includes an original portion of a source document, metadata for that source document portion, contextual information associated with that source document portion, a corresponding coarse vector(s) resulting from a transformation applied to one or more fixed-sized (or substantially fixed-sized) segments of the original portion of the source document (to facilitate a fast-search process), a corresponding resultant fine-detail transformed content resulting from a fine-detail transformed (to facilitate a more accurate and refined textual search), etc. Thus, if the transformation resulted in a vector of values representative of the textual content of a segment, that vector is stored in the repository, possibly in association with metadata (added or embedded into the vector), and/or in association with the original content (in situations where the actual original text-content is preserved). In some embodiments, for security or privacy reasons, the source content may be discarded upon its ingestion, or may be available only at the customer's site. Metadata associated with the transformed content may include contextual information associated with the original source content, and document location information that indicates the location or position of source content that resulted in the transformed content within the larger source document. Such document location information can be provided in the form of pointer information pointing to a memory location (or memory offset location) for the source document stored in the customer network, i.e., so that when the pointer information is returned to a requesting user, it can be used to locate the memory location where the relevant content constituting an answer to the user's query can be found. It is to be noted that some documents stored in the DOM repository 340 (or in the repository 202 of FIG. 2) may be substantially unstructured, and may lack metadata or other information indicative of the nature of the source content that resulted in the DOM document. As noted, in such situations, the framework realized by the system 300 can be used to determine structured information for the documents lacking that information by applying to the document a query set with pre-determined questions covering a wide range of subject matter areas and concepts, and using the resultant answer data (and associated level of completeness and relevance scores) to determine the documents' structured information.

The transformed content (which may include several transformed content items, resulting from the various transformations applied to segmented content), metadata, various representation of the document's structured information, and/or source content stored in the repository 340 together may define a unified record structure, in which each of the transformed content, metadata, and/or original source content is a field or a segment of the unified record structure. Individual records, when they correspond to discrete document segments of a larger source document, can be associated with each other (e.g., by arranging them sequentially or through logical or actual links/pointers) to define larger document portions (e.g., chapters for a particular document), or to define the entire original document that was segmented and ingested.

As further shown in FIG. 3, the document processing agent 310 further includes the query unit (also referred to as a query stack) that is configured to receive inputs (data representative of queries from one or more users authorized to submit queries in relation to at least some of the ingested documents arranged in the DOM repository 340), and in turn provide output data returned to the initiating user. The query stack includes the interactive user query interface 330 (which may be similar to, or implemented using the same hardware and software as the server interface 320) in communication with a query processing module 336 (also referred to as a query engine). The query processing module may include a transform engine to apply to queries submitted by users similar transformation(s) to generate transformed query data that is compatible with the transformed content in the DOM records 342a-n maintained within the DOM repository 340. The transformed query can include coarse numerical vector type transformed data that can be used to search numerical vector transformed content in the repository 340, fine-detail transformed query (that can be used to search similarly formatted fine-detail transformed content in the repository 340), or any other transformed format (using one or more language model transforms) that may have been used to ingest the source document.

The interactive interface 330 may be configured to not only receive and process query data from the user, and provide query output back to the user, but also to determine (on its own, or in combination with other modules of the agent 310) disambiguation information. That disambiguation information may include initially-provided (with the query) disambiguation information to help with the initial searching/matching operations (e.g., prefiltering operations) performed on the searchable content managed by the agent 310 (either in the DOM repository 340 or the cache 335). The disambiguation information may also include postfiltering disambiguation information dynamically generated that is presented to the user to solicit the user to provide clarifying information to resolve ambiguity present in two or more of the query results. For example, when two answers are associated with the same or similar concept/category of information (be it an entity name, associated contextual information, or some abstract concept derived using natural language processing or a learning machine implementation) but have different concept/category values, intermediary output may be provided to the user (e.g., as a visual disambiguation prompt, or an audio disambiguation prompt) requesting the user to provide clarification information specifying which of the identified concepts is more relevant to the user's query. The disambiguation information returned by the user is then used to select one or more of the initial matches (and may eliminate some other matches), and/or to rank (based on computed relevance determined using the returned input from the user) the initial or remaining matches. Further details regarding disambiguation processing are provided in international application No. PCT/US2022/053437, entitled "Contextual Clarification and Disambiguation for Question Answering Processes," the content of which is hereby incorporated by reference in its entirety.

In some embodiments, the interactive interface 330 may also be configured to allow the user to provide personalization information that can be used to customize/personalize a query set that is applied to a particular document (generally unstructured) so as to revise or supplement the library of questions to include more specific questions or to include questions covering additional concepts that may not have been covered (or adequately covered) in the initial set of pre-determined question meant to determine the concepts and subject matter areas a particular document pertains to. The user's interactive input can also be obtained to control or personalize one or more of the post-search processing that are to be executed on answer data determined from application of the universal question set to the particular document. For example, the answer data resulting from the application of the universal question set may indicate that the document relates to financial data for some company, and may thus trigger multiple types of available report generating processes. The user may then be asked, via the interactive interface 330, to select from the available processes and/or to select report formatting customization options.

With continued reference to FIG. 3, in embodiments in which the repository 340 includes multiple types of transformed source content, the search of the repository 340 may be implemented as a multi-pronged search. For example, because coarse numerical vector representation is generally more compact and easier to search (but may not as accurate as fine-detail transformed representations, whether achieved by a BERT-based transformation or some other transformation), a first prong of a search to determine an answer to a submitted query may be to convert the query data into coarse vector representation, and to use that first transformed query representation to search records in the repository 340 matching (e.g., according to some closeness criterion that may represent the distance, or difference, between the transformed vector query data and the transformed vector ingested content data) the coarse numerical-based transform of the query data. This type of initial searching may be referred to as fast-search. The results of the search may result in the identification of one or more answer candidates (e.g., identify 1000, or any other number, of possible segments that may contain an answer word sequence responsive to the query submitted by the user). The identified first batch of possible results can then be used to perform the second stage of the search by converting the query to a fine-detail transformed query and searching fine-detail transformed content associated with the search results identified in the first stage of the search process. This searching stage may be referred to as the detailed, or fine-grained, search. It is to be noted that, in some embodiments, the fast search may be used to identify the original portions of source content associated with the identified candidates, and those identified portions may then be transformed into fine-detail transform content. In such embodiments, the repository 340 does not need to maintain fine-detail transformed content, but rather the transformation of source content is done based on which portions have been identified by the fast-search as possibly containing an answer to the query. In alternative examples, searching for answers to a query may be performed directly on the entire fine-detail transformed content records without first identifying possible candidate portions of source content through a fast-search of fast-searched transformed content records. In some embodiments, the fast-search and the fine-detail search may be performed on different transformed representations of the content of the document searched. For example, a fast-search may be performed on content transformed using one type of language model transform (e.g., BERT), while the fine-detail search may be performed on a different transformation of the content (e.g., according to the GPT3 language model).

Thus, in some embodiments, the query stack (e.g., the query processing module 336) is configured to transform the query data into transformed query data compatible with the transformed source content (e.g., compatible with one or more of the transformed content records in the DOM repository 340). For example, the fast-search-compatible transformation may be a coarse BERT-based transformation (e.g., using a learning engine implementing the same or similar trained learning model used to produce the searchable transformed content from the source data) that is applied to the entire query data (e.g., a natural language question) to produce a single vector result. The query processing module may, for example, launch a fast-search process in which it identifies one or more candidate portions in the transformed source content (with respective numerical vectors resulting from the coarse transformation) matching, according to a first criterion, the transformed query data. For example, the matching operation may be based on some closeness or similarity criterion corresponding to some computed distance metric between a computed vector transformed query data and various vector transformed content records in the repository 340. As described herein, in some embodiments, the transformed content may include vectors corresponding to possible questions that users may ask to which the source content provides a possible answer. The fast search may thus, in some embodiments, compare the transformed query result (generally a resultant vector record) to searchable vector records representative of possible questions that could be asked in relation to source content from which those searchable vectors were generated.

The query processing module 336 may be further configured to determine, from one or more fine-detail transformed content records corresponding to the one or more candidate portions identified based on their coarse transformed vectors, at least one fine-detail transformed content record matching, according to a second criterion (e.g., some other closeness or similarity metric, or the same criterion applied with respect to the coarse transformation data), a fine-detail transformed data of the query data. Alternatively, in embodiments in which a fast-search is not performed, the query processing module 336 may be configured to identify one or more candidate portions in the transformed source content with respective fine-detail transformed content records matching, according to the second criterion, the transformed query data.

In some embodiments, the interface 330 and/or the query processing module may be coupled to a query cache 335 and a question generation unit (which may be part of the cache 335 or of the query processing module 336, or may be a separate unit). The query cache 335 stores, among other things, answers/contents corresponding to frequently asked questions. Such answers/contents may include content previously retrieved from the DOM documents (and/or from their corresponding raw source content) in response to previously submitted queries. Counters associated with such cached answers can track the frequency at which specific questions and answers have been submitted and/or retrieved. The cache 335 can also be configured to discard stale cached content that has not been accessed within some reference (threshold) time interval. Content in the answer cache may also have been stored by the administrator (e.g., operating from a station, such as the station 352 via the admin interface 325) in anticipation of some likely questions that users of the customer system (network) 350a were expected to submit, or to override content that may have been retrieved from the DOM repository 340 (e.g., content that, based on subsequent feedback from users, was determined to be inaccurate or unresponsive to the query submitted). Thus, in some embodiments, the query stack is configured to determine whether received query data matches one of pre-determined questions (which may be stored in the answer cache), and to generate the output data based on one or more answer data records (possibly stored within the answer cache) in response to determining that the received query data matches one of the pre-determined questions. In some embodiments, the matching of query data to the past questions and associated answers stored in cache is performed by computing a score that is based on the combination of the questions and their answers, and ranking the computed scores to identify one or more likely matching candidates.

The query processing module may also include a question generation engine that can determine (e.g., based on a trained learning engine and/or using a repository of question data) follow-up or related questions to one or more questions submitted through the query data. Follow-up questions can be generated by paraphrasing the query submitted, e.g., transforming and/or normalizing the submitting query to modify the question submitted using, for example, a trained learning engine. In some embodiments, answer data determined for the submitted query (e.g., based on content retrieved from the DOM repository 340 via the query processing module 336) may be processed (by a separate module) to formulate further questions from the answer. Such derived questions can then be re-submitted to the query processing module to retrieve follow-up answers. This process can be iteratively repeated up to a pre-determined number of times. In some situations, the content stored in the DOM repository 340 may associate multiple questions (represented in whichever transformation format(s) that was applied during the document ingestion stage) with each processed segment of the source document. As noted, generation of transformed content may include, for each processed segment, data representative of questions associated with the processed segment, metadata, and content that may be provided in transformed format and/or the original source content. Thus, upon submission of a query (generally in transformed format computed according to one or more language model transforms and/or different level of content processing granularity) at least one DOM record/element will be identified. That search result may possibly be associated with multiple questions, including the question that may have resulted in a match between the identified resulted and the submitted query. One or more of the additional questions (i.e., other than the question that was matched to the query) may be used as a separate query to re-submit for searching to identify additional content that may be germane to the original query submitted by the user.

As noted, generation of supplemental questions (also referred to as question augmentation) may be performed with respect to the universal question set that is applied to a document to determined structured information. For example, upon retrieving the query set (comprising the set of universal questions) from, for example, the cache 335 (or from some other storage device) at least some of the questions may be processed by the query processing module to formulate follow-up questions, or to formulate synonymous questions (that might better match with the specific content of the document to be analyzes with the universal question set) that can be submitted by the query processing module to apply those supplemental questions to the document being processed (e.g., the document $D_X$ of FIG. 2) or to other documents in the repository 340 (or in remote repositories accessible by the document processing agent 310). Additionally, in some embodiments, the query processing module may be configured to generate supplemental questions based on the answer data generated in response to applying the initial universal question set to the particular document being processed. For example, based on identifying relevant answers to one or more of the questions (that indicate the relevance of the document to an associated concept or subject matter area), the answer data for the identified relevant questions or the associated concepts or subject matter areas can be used (e.g., using a machine learning model to generate labels corresponding to the identified answers, concepts, and/or subject matter areas) to generate follow-up questions that may be relevant to the determined answer data, concepts, and subject matter areas, or to generate questions to determine any missing data that is not included in the answer data to the identified relevant answers. Furthermore, the query processing module (or some other unit of the document processing agent 310) may be configured to determine questions required to complete any information missing from reports, or other structured output, generated in response to the answer data determined from the application of the universal set of questions (and/or additional iterations of question-answering processing following the initial application of the universal set of question). For example, in a situation involving preparation of a financial report requiring, among other things, the salary of the CEO for the company referenced in the original source document being processed, the CEO's name and salary may not have been included in that source document. In this situation, the report generating process may be configured to cause the query processing module of the system 310 to generate questions, to be applied to the same and/or other documents in the repository 340 (or to remote repositories) that are associated with the company in question (as may be indicated by entity metadata and other contextual information associated with the documents to be searched), to determine the name of the CEO and the CEO' salary.

As further shown in FIG. 3, the determination of an answer to a query can be initiated by a user submitting a query 372 via a link 370 established between a station 354*a* and the interface 330 (as noted with respect to the links established to transfer source documents for ingestion, the links can be based on any type of communication technology or protocol, including wired and wireless communication protocols). The query 372 may be an actual unprocessed question submitted by the user, or may be partially or fully transformed (e.g., for privacy and security reasons). For example, the station 354*a* may apply a transformation commensurate with the transformation applied by the ingestion engine 326 (in which case, performing a similar transformation at the query stack may become unnecessary). Alternatively or additionally, authentication and encryption processing may be performed on the query 372. The query (question data) 372 is transmitted to the document processing agent 310, and is received at the user query interface 330. Upon receipt of the query, a determination may be made as to whether appropriate answers are available in the cache 335 of pre-determined answers. If there is a pre-determined question-and-answer (e.g., the query data matches one or more pre-determined questions), one or more of the pre-determined answers is used to generate the output data (illustrated as output data 374) that is returned to the user via the link 370 (or through some other link). As noted, in some embodiments, the query submitted may be a set of pre-determined questions that are configured to help determine structured information for an otherwise unstructured (or poorly structured) document. In such embodiments, the query set may be stored locally at the document processing agent (e.g., at the cache) and may be applied automatically to certain documents, e.g., newly arriving documents meeting certain conditions (e.g., documents arriving from some pre-designated third-party data provider or vendor).

Generally, the query data is transformed (if it was not already transformed at the station 354*a*) by the query stack into transformed query data. The transformed data may provide the query in one or more transform formats that are compatible with the formatting of the transformed source content stored in the DOM repository 340. In some embodiments, the query data may also be used to generate one or more additional questions (e.g., follow-up questions, or questions related to the original query submitted by the user). In situations where an answer to the query is available from an answer cache, which answer itself may be used as a basis for generating further one or more questions that may be related to the cached answer(s). The query or the transformed query is used to search, via the query processing module 336, the DOM repository 340. As noted, the searching may be performed as a multi-pronged process according to multiple transformation formats used to store data in the DOM repository 340.

The output generated in response to a submitted query may include a pointer to the source content available at the customer network 350*a*. Because, in such embodiments, the data stored in the repository 340 is ingested based on source documents maintained at a document library available at the customer network, to which the user submitting the query has access, and because the source document might not have been stored in their original form at the document processing agent 310 (e.g., for security reasons, in order to protect sensitive data from being compromised), the output that is returned to the user does not require that actual answer data be sent back to the user. Instead, the pointer returned as the output of the query can identify the address or location of the answer within the appropriate document available to the user at the user's network 350. For example, in the illustrated example of FIG. 3, the output data 374 is shown as a pointer to the specific location of the answer in the document 362*a* (stored in the library 360 along with documents 362*b-d*). Such a pointer may thus include data representing the document 362*a*, e.g., a network address or a memory location where the start of the document is located, and a specific location of the portion(s) of the document that represents the answer to the question asked by the user at the station 354*a* (e.g., a relative offset from the beginning of the starting location of the document 362*a*, or an actual address or memory location where the starting point of the identified portion(s) is located). The pointer data provided in the output data may have been included in a metadata field of a DOM record that included transformed content data determined (e.g., by the query processing module 336) to match (according to one or more applied matching criteria) the query submitted by the user. In some embodiments, the output data may include, in addition to or instead of the pointer data, at least part of the source content corresponding to the at least one portion of the transformed content and/or a summary of the source content corresponding to the at least one portion of the transformed content.

As discussed in relation to FIGS. 1 and 2, the output generated in response to answer data determined through application of the universal question set to one or more unstructured documents includes various types of structured output data generated by corresponding post-Q-A processing. Such post-Q-A processing may be performed at the document processing agent 310 (e.g., by the query processing module 336 and/or the interactive query interface 330), or may performed at another computing device located remotely from the document processing agent 310. Such post-Q-A processing (i.e., downstream processes) includes, as discussed in relation to the systems 100 and 200 of FIGS. 1 and 2, respectively, report/summary generation processes, document generation processing (e.g., to automatically produce various needed legal or administrative documents), database management processes (to automatically populate structured data records in databases or repositories), data mining processes, and other types of processes based on information derived from the documents analyzed.

Figure 4:
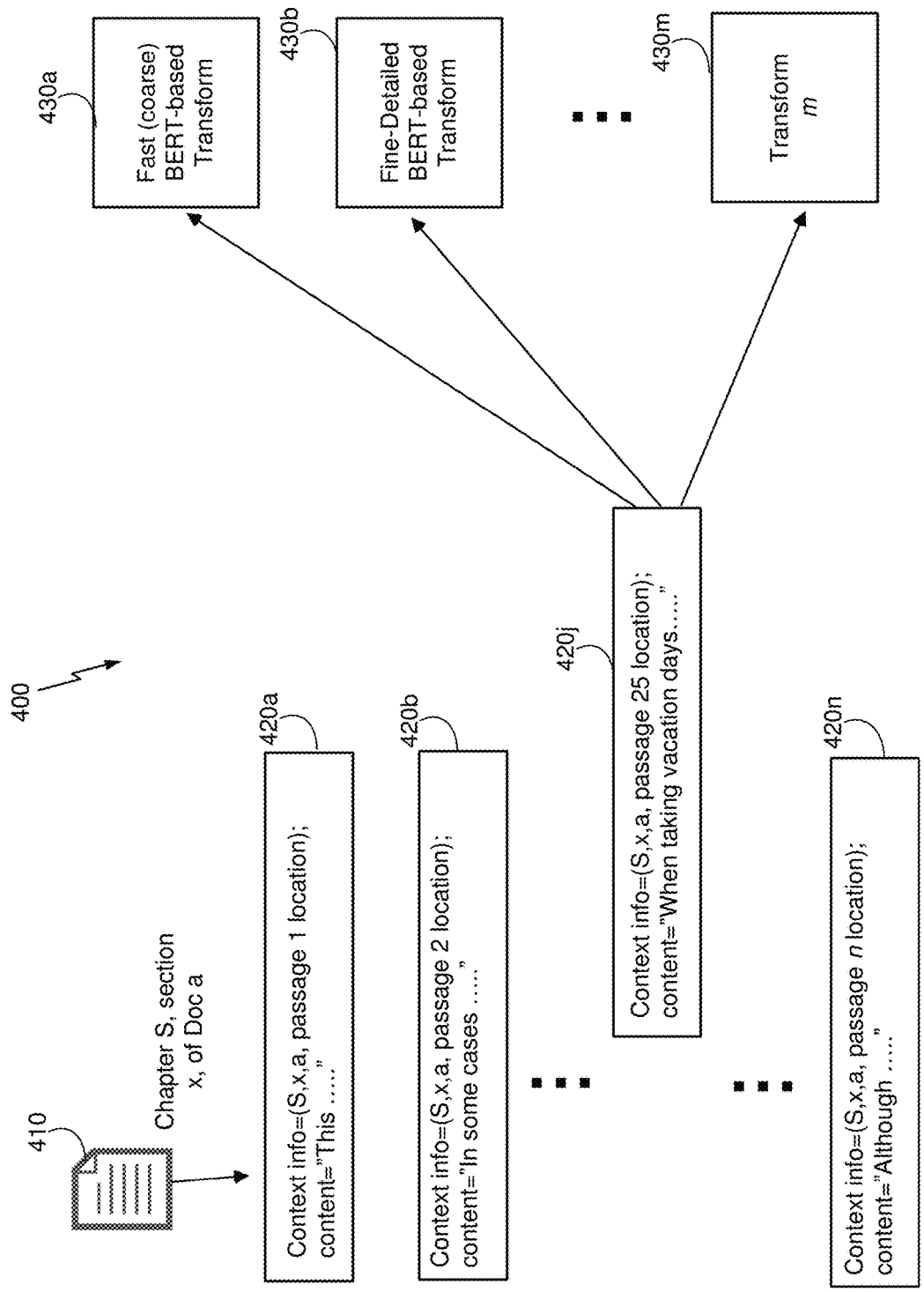
FIG. 4 is a diagram of an example document ingestion procedure.

As discussed in relation to FIG. 1, the source document typically undergoes pre-processing, including secured communication processing (decrypting and/or authentication), document formatting, initial contextual discovery, content transformation (e.g., converting text into vector representation), and other pre-processes to convert the source document into a Q-A searchable document. One example of a document formatting pre-processing procedure is the segmentation of source content for a source document into multiple document segments. Such segmentation can be performed according to hierarchical rules semantically associating one portion of the source document with one or more other portions of the source content. For example, a sliding window of a fixed or variable size (e.g., 200 words) can be applied to the source content to generate manageable-sized segments on which to apply content transforms. However, when segmented into small chunks, the content segments may lose important contextual information that otherwise would have been available for a larger size segment. For example, a passage in the middle of a section of a document may, in isolation, not include important contextual information such as the section heading, location of the passage relative to earlier passages in the section, font sizes associated with other passages not captured by a particular segment (e.g., when the present passage is a footnote), etc. Therefore, in some embodiments, contextual information (e.g., section heading, chapter heading, document title, location, font type and size, etc.) may be combined with one or more of the document segments. This pre-processing procedure is illustrated in FIG. 4, providing a diagram of an example document pre-processing (also referred to as ingestion) procedure 400. In FIG. 4, a source content 410 (which may be part of a source document) has been segmented into segments 420*a-n*. Each segment has its own individual segmented content (resulting from applying a segmenting window to the source content), that may be combined with contextual information (which may be text information, numerical information, or both) associated with each segment. As can be seen, at least some of the contextual information, namely the document identity ("Doc a"), the Chapter information (Chapter S), and the heading information (section x) is common to the segments illustrated in FIG. 4. This allows the transformation that are subsequently applied to the segment to preserve at least some of the contextual information, and thus preserve some of the relevance of the segment being transformed to the subject matter.

In some examples, to simplify the segmentation process (so as to facilitate more efficient searching and retrieval), the source documents may be segmented to create overlap between the sequential document segments (not including the contextual information that is separately added to each segment). Thus, for example, in situations where a segment is created by a window of some particular size (constant or variable), the window may be shifted from one position to the following position by some pre-determined fraction of the window size (e.g., ¾, which for a 200-word window would be 150 words). As a result of the fractional shifting, transformations (e.g., language model transformations) applied to overlapped segments results in some correlation between the segments, which can preserve relevancy between consecutive segments for subsequent Q-A searching. In some embodiments, heading information (and other contextual information) may be added directly to partitioned segments. Alternatively, heading and contextual information may either be transformed into vectors that are then added to the vectors resulting from transformation operations applied to the content extracted by the sliding window, or may be combined with the content extracted by the window before the transformation is applied to the resultant combined data. By associating neighboring segments with each other (e.g., through fractional shifting of the window over a document to form the segments), identification of relevant paragraphs (responsive to submitted queries), for the retrieval and presentation processing for top paragraphs and associated answer snippets, is improved.

Another pre-process that can be applied during segmentation of the source document relates to the handling of table information (i.e., when the original content is arranged in a table or grid). This pre-processing is used to expand structured data arranged in tables (or other types of data structures) into searchable form such as equivalent text. For example, upon identifying a portion of the source document as being a multi-cell table, substitute portions are generated to replace the multi-cell table, with each of the multiple substitute portions including a respective sub-portion content data and contextual information associated with the multi-cell table. Additional examples of pre-processes include a procedure for associating contextual information with one or more portions of the source document based on, for example, a) information provided by a user in response to one or more questions relating to the source document that are presented to the user, and/or b) based on one or more ground truth samples of question-and-answer pairs.

In some examples, contextual information might not be explicitly included with a segment, but instead may need to be discovered, and included with document segments as augmented information (in this case, augmented contextual information). For example, entity discovery (determining identity of relevant entities referenced in the document) can be used to help speed up the search, and to improve searching accuracy.

Consider the following example implementations:
Each search unit (e.g., 200-word windows, paragraphs, documents, etc.) is analyzed with respect to the inherent entities associated with the search unit, and also analyzed with respect to metadata associated with entities for a particular task (e.g., HR, author, organization etc.)
Each search unit is tagged with the appropriate inherent and metadata entities.
During the search, different heuristics can be used which could eliminate many of these search units by identifying them as irrelevant to the query at hand. For example, in one use case, where the user's question is determined with a high degree of confidence to relate to some specific subject matter (e.g., because the user explicit identification of the subject matter, e.g., a question stating "I have a financial question," or because the subject matter can be inferred, through rules or classification engines, to pertain to the particular subject matter), all documents/document objects for other subject matters (HR, security, etc.) can be eliminated from further consideration, and those documents do not need to be searched in response to the submitted query.
The by-product of such filtering is to speed up, for example, the FM and DM searching. Additionally, potential answer units from irrelevant categories do not create mis-recognition errors, and consequently this helps to improve the accuracy of searches.

Information about a specific entity (or entities) relevant to a user's search can also be used to generate more accurate additional questions (e.g., to determine different ways to paraphrase the input query so that additional possible question-answer pairs can be generated), and also to provide additional context that can be used to search the repository of data (be it DOM objects in transformed form, or user-readable data formatting).

In some embodiments, document pre-processing can be performed as two separate tasks. In one processing task, the source document is properly segmented and organized into small chunks, e.g., paragraphs, with additional augmentations (e.g., the vector sequence that represents the heading of a section can be appended to the vectors of every paragraph in that section). These augmentations are used to improve the retrieval accuracy. In a parallel task, a document is segmented in the most appropriate way for presentation purposes. The two different resultant segmentation outputs need to be associated with each other such that when, during retrieval processing, the top paragraphs and associated answer snippets are identified, but what is presented to the user are the presentation contents (rather than the identified answer snippets) associated with the identified answer snippets. In other words, the system can ingest a particular passage to facilitate searching operations, and separately ingest that particular passage to facilitate presentation operations. In this example, upon identifying the passage as a result of matching a query to the searchable ingested content, the presentation content associated with the identified passage is outputted.

Having segmented a source document into multiple segments, each segment may be provided to one or more content transforms (or transformers) 430$a$-$m$ that transform the segment (content, and optionally the contextual information, although in some embodiments the contextual information may be preserved without transforming it) into a resultant transformed content that is associated with question(s) and answer(s) related to the original content of the respective segments. In the example of FIG. 4, m transforms are shown, each being applied to any one of the segments (such as the segment 420$j$). Although the same segment, for example 420$j$, is shown as being provided to each of the transforms, in some embodiments, different segmentations procedures may be applied to obtain segments of different sizes and configurations as may be required by each of the individual transforms (e.g., the coarse, fast-search BERT-based transform 430$a$ may be configured to be applied to a segment of a first segment size, while the fine-detail BERT-based transform 430$b$ may be configured to be applied to a segment of a second, different size (e.g., strings of several words)).

The transform modules may be implemented through neural networks that have been pre-trained to produce transformed content associated with question-answer pairs. Other transform implementations may be realized using filters and algorithmic transforms. Training of neural network implementations may be achieved with a large training samples of question-answer ground truths that may be publicly available, or may have been internally/privately developed by the customer using a document processing system (such as the system 300 of FIG. 3) to manage its document library.

Figure 5:
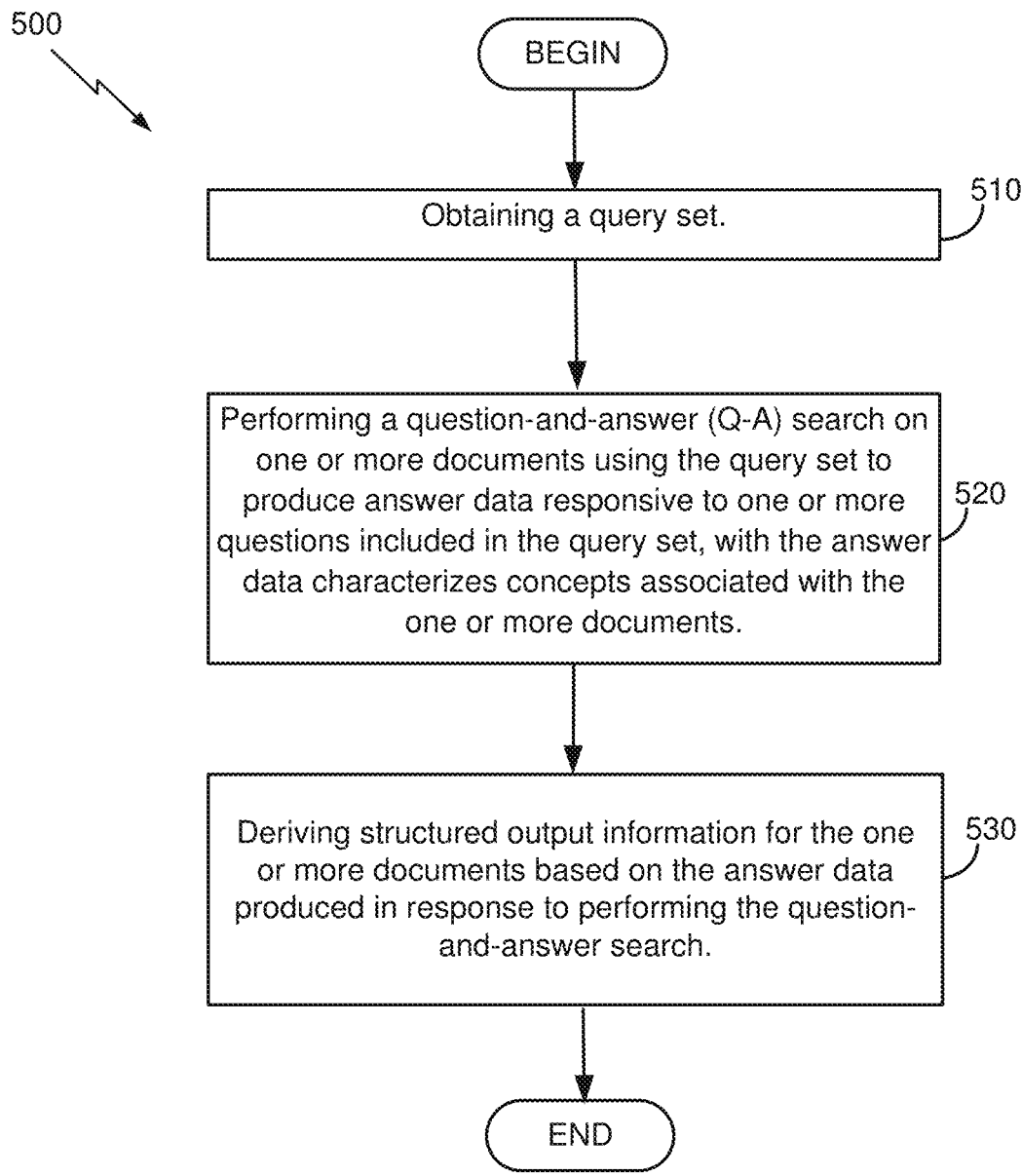
FIG. 5 is a flowchart of a procedure for guided, intelligent document processing via automatic question answering.

With reference next to FIG. 5, a flow chart of an example procedure 500 for guided intelligent document processing via automatic question answering, implemented on examples systems such as the systems 100, 200, and 300 of FIGS. 1-3, respectively, is shown. The procedure 500 includes obtaining 510 a query set, performing 520 a question-and-answer (Q-A) search on one or more documents using the query set to produce answer data responsive to one or more questions included in the query set, with the answer data characterizes concepts associated with the one or more documents, and deriving 530 structured output information for the one or more documents based on the answer data produced in response to performing the question-and-answer search.

As noted, the query set may be a universal set of multiple questions relating to a plurality of different content subject matter areas. That is, the query set may include a wide range of questions covering multiple topics, concepts, and subject matter areas that include financial matters, legal matters, sports, domestic and international affairs, and so on. In some examples, obtaining the query set may include adjusting a pre-determined set of questions based on user information associated with a user. Such user information may include one or more of, for example, personal preferences of the user, network access control associated with the user, and/or network groups the user is associated with. In some embodiments, the procedure 500 may further include determining additional queries based on at least some of the answer data, and performing an additional question-and-answer search for the one or more documents using the additional queries. In such embodiments, determining the additional queries may include determining, using one or more ontologies defining relationships and associations between a concept identified from the at least some of the answer data, and different other concepts, and deriving additional questions for the additional queries based on the different other concepts determined using the one or more ontologies.

As discussed herein, structured output data is generated using one or more downstream post-Q-A processes (e.g., to generate reports or summaries, determined additional information from secondary sources, perform data mining and clustering, and so on). Thus, deriving the structured output information for the one or more documents may include one or more of, for example: i) determining classification information for the one or more documents representative of at least one of the concepts, ii) performing data clustering for the one or more documents based on the answer data, iii) applying a data discovery process to the answer data to determine one or more labels relevant to the concepts associated with the one or more documents, iv) generating an output report based on the answer data, and/or v) deriving supplemental data relevant to at least some of the answer data. For example, deriving the supplemental data relevant to at least some of the answer data may include determining a supplemental concept related to the at least some of the answer data, accessing at least one of the one or more documents or another data source, and determining supplemental information related to the supplemental concept from the accessed at least one of the one or more documents or the other data source. In such embodiments, determining the supplemental concept may include determining a supplemental question to apply to the at least one of the one or more documents or the other data source.

In some examples, generating the output report may include one or more of, for example, i) generating a summary report, provided to a user, based on at least some of the answer data, with the at least some of the answer data being arranged in one or more pre-defined templates, ii) generating an alert communicated to the user, and/or iii) populating a database table with at least some of the answer data. In some examples, generating the output report may include determining scores for the answer data produced in response to performing the question-and-answer search using the query set, and including in the output report a pre-determined number, $N_1$, of answers, determined from the answer data, with highest scores. In such examples, the procedure 500 may further include identifying from the answer data results additional answers whose respective scores exceed a pre-determined score threshold, and selecting from the additional answers whose respective scores exceed the pre-determined score threshold a maximum of $N_2$-$N_1$ selected answers for inclusion in the output report, with $N_2 > N_1$.

Generating the structured output information may include generating the structured output information based on the answer data, and further based on user information associated with a user. The user information may include one or more of, for example, personal preferences of the user, network access control associated with the user, and/or network groups the user is associated with.

In some embodiments, deriving the structured output information may include applying one or more machine learning models to at least some of the answer data.

The procedure 500 may further include determining scores for the answer data produced in response to performing the question-and-answer search using the query set. In such examples, generating the structured output information for the one or more documents may include generating the structured output information for the document based on the determined scores for the answer data. Generating the structured output information may include determining the one or more documents are unrelated to one or more of the plurality of different content subject matter areas (associated with the questions constituting the universal set of questions of the query set) based on the determined scores for the answer data produced in relation to questions, from the plurality of questions, relating to the one or more the plurality of the different content subject matter areas. Determining the scores for the answer data may include computing, for a particular answer responsive to a particular question from the one or more questions in the query set, a score representative of one or more of, for example, similarity of the particular answer to the particular question, similarity of a combination of the particular question and the particular answer to pre-determined question-answer pairs for the one or more documents, similarity of the particular answer to previously chosen answers provided to a particular user, relative location of the particular answer in the one or more document, and/or a level of detail contained in the particular answer.

As noted, the framework described herein may perform pre-processing (also referred to as ingesting) on received source documents. In such embodiment, the procedure 500 may further include receiving one or more source documents, and converting the one or more source documents into the one or more documents on which the Q-A search is performed. Converting the one or more source documents may include applying one or more segmentation pre-processes to the one or more source document to produce one or more segmented documents, and applying to the one or more segmented documents one or more vector-transforms to transform the one or more segmented documents into vector answers in respective one or more vector spaces. Applying the one or more vector-transforms may include transforming the segmented one or more documents according to one or more of, for example, a Bidirectional Encoder Representations from Transformers (BERT) language model, a GPT3 language model, a T5 language model, BART language model, an RAG language model, a UniLM language model, a Megatron language model, RoBERTa language model, an ELECTRA language model, an XLNet language model, and/or an Albert language model.

In some embodiments, deriving the structured output information may further be based on interactive data provided by a user. For example, the interactive data may include disambiguation data provided in response to prompt data generated by a Q-A system to select answers from multiple matches in the answer data related to one or more similar concepts.

In implementations described herein that are based on learning machines, different types of learning architectures, configurations, and/or implementation approaches may be used. Examples of learning machines include neural networks, including convolutional neural network (CNN), feed-forward neural networks, recurrent neural networks (RNN), etc. Feed-forward networks include one or more layers of nodes ("neurons" or "learning elements") with connections to one or more portions of the input data. In a feedforward network, the connectivity of the inputs and layers of nodes is such that input data and intermediate data propagate in a forward direction towards the network's output. There are typically no feedback loops or cycles in the configuration/structure of the feed-forward network. Convolutional layers allow a network to efficiently learn features by applying the same learned transformation(s) to subsections of the data. Other examples of learning engine approaches/architectures that may be used include generating an auto-encoder and using a dense layer of the network to correlate with probability for a future event through a support vector machine, constructing a regression or classification neural network model that indicates a specific output from data (based on training reflective of correlation between similar records and the output that is to be identified), etc.

The neural networks (and other network configurations and implementations for realizing the various procedures and operations described herein) can be implemented on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's, which can be programmed according to, for example, a CUDA C platform), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural network, processes, and methods described herein. The computing platforms used to implement the neural networks typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

The various learning processes implemented through use of the neural networks described herein may be configured or programmed using TensorFlow (an open-source software library used for machine learning applications such as neural networks). Other programming platforms that can be employed include keras (an open-source neural network library) building blocks, NumPy (an open-source programming library useful for realizing modules to process arrays) building blocks, etc.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Any of the features of the disclosed embodiments described herein can be combined with each other, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
receiving one or more source documents;
converting the one or more source documents into one or more documents on which a question-and-answer (Q-A) search can be performed;
obtaining a query set including a universal set of a plurality of questions relating to a plurality of different content subject matter areas;
performing a Q-A search on the one or more documents using the query set to produce answer data responsive to one or more questions included in the query set, wherein the answer data characterizes concepts associated with the one or more documents;
determining scores for the answer data produced in response to performing the question-and-answer search using the query set; and
deriving structured output information for the one or more documents based on the answer data produced in response to performing the Q-A search and the determined scores for the answer data, the deriving including determining that one or more of the documents is unrelated to one or more of the plurality of the different content subject matter areas based on the determined scores for the answer data produced in relation to questions, from the plurality of questions, relating to the one or more the plurality of the different content subject matter areas and one or more of:
determining classification information for the one or more documents representative of at least one of the concepts,
performing data clustering for the one or more documents based on the answer data,
applying a data discovery process to the answer data to determine one or more labels relevant to the one or more concepts associated with the one or more documents,
generating an output report based on the answer data, and
deriving supplemental data relevant to at least some of the answer data.

2. The method of claim 1, wherein deriving the supplemental data relevant to at least some of the answer data comprises:
determining a supplemental concept related to the at least some of the answer data;
accessing at least one of: the one or more documents, or another data source; and
determining supplemental information related to the supplemental concept from the accessed at least one of the one or more documents or the other data source.

3. The method of claim 2, wherein determining the supplemental concept comprises determining a supplemental question to apply to the at least one of the one or more documents or the other data source.

4. The method of claim 1, wherein generating the output report comprises one or more of:
generating a summary report, provided to a user, based on at least some of the answer data, wherein the at least some of the answer data is arranged in one or more pre-defined templates;
generating an alert communicated to the user; or
populating a database table with at least some of the answer data.

5. The method of claim 1, wherein generating the output report comprises:
determining scores for the answer data produced in response to performing the question-and-answer search using the query set; and
including in the output report a pre-determined number, $N_1$, of answers, determined from the answer data, with highest scores.

6. The method of claim 5, further comprising:
identifying from the answer data results additional answers whose respective scores exceed a pre-determined score threshold; and
selecting from the additional answers whose respective scores exceed the pre-determined score threshold a maximum of $N_2 - N_1$ selected answers for inclusion in the output report, wherein $N_2 > N_1$.

7. The method of claim 1, wherein generating the structured output information comprises:
generating the structured output information based on the answer data, and further based on user information associated with a user.

8. The method of claim 7, wherein the user information comprises one or more of:
personal preferences of the user, network access control associated with the user, or network groups the user is associated with.

9. The method of claim 1, further comprising:
determining additional queries based on at least some of the answer data; and
performing an additional question-and-answer search for the one or more documents using the additional queries.

10. The method of claim 9, wherein determining the additional queries comprises:
determining, using one or more ontologies defining relationships and associations between a concept identified from the at least some of the answer data, and different other concepts; and
deriving additional questions for the additional queries based on the different other concepts determined using the one or more ontologies.

11. The method of claim 1, wherein determining the score for the answer data comprises:

computing, for a particular answer responsive to a particular question from the one or more questions in the query set, a score representative of one or more of: similarity of the particular answer to the particular question, similarity of a combination of the particular question and the particular answer to pre-determined question-answer pairs for the one or more documents, similarity of the particular answer to previously chosen answers provided to a particular user, relative location of the particular answer in the one or more documents, and a level of detail contained in the particular answer.

12. The method of claim 1, wherein generating the structured output information comprises:
applying one or more machine learning models to at least some of the answer data.

13. The method of claim 1, wherein obtaining the query set comprises:
adjusting a pre-determined set of questions based on user information associated with a user.

14. The method of claim 13, wherein the user information comprises one or more of: personal preferences of the user, network access control associated with the user, or network groups the user is associated with.

15. The method of claim 1, wherein converting the one or more source documents comprises:
applying one or more segmentation pre-processes to the one or more source documents to produce one or more segmented documents; and
applying to the one or more segmented documents one or more vector-transforms to transform the one or more segmented documents into vector answers in respective one or more vector spaces.

16. The method of claim 15, wherein applying the one or more vector-transforms comprises:
transforming the one or more segmented documents according to one or more of: a Bidirectional Encoder Representations from Transformers (BERT) language model, a GPT3 language model, a T5 language model, a BART language model, an RAG language model, an UniLM language model, a Megatron language model, a ROBERTa language model, an ELECTRA language model, an XLNet language model, or an Albert language model.

17. The method of claim 1, wherein deriving the structured output information is further based on interactive data provided by a user.

18. The method of claim 17, wherein the interactive data includes disambiguation data provided in response to prompt data generated by a Q-A system to select answers from multiple matches in the answer data related to one or more similar concepts.

19. The method of claim 1 wherein deriving structured output information further includes determining that one or more of the documents is related to one or more of the plurality of the different content subject matter areas based on the determined scores for the answer data produced in relation to questions, from the plurality of questions, relating to the one or more the plurality of the different content subject matter areas.

20. A system comprising:
one or more memory storage devices to store executable computer instructions and data; and
a processor-based controller electrically coupled to the one or more memory storage devices, the controller configured to:
receiving one or more source documents;
converting the one or more source documents into one or more documents on which a question-and-answer (Q-A) search can be performed;
obtain a query set including a universal set of a plurality of questions relating to a plurality of different content subject matter areas;
perform a question-and-answer (Q-A) search on one or more documents using the query set to produce answer data responsive to one or more questions included in the query set, wherein the answer data characterizes concepts associated with the one or more documents;
determine scores for the answer data produced in response to performing the Q-A search using the query set; and
derive structured output information for the one or more documents based on the answer data produced in response to performing the Q-A search and on the determined scores for the answer data, the deriving including determining that one or more of the documents is unrelated to one or more of the plurality of the different content subject matter areas based on the determined scores for the answer data produced in relation to questions, from the plurality of questions, relating to the one or more the plurality of the different content subject matter areas and one or more of:
determining classification information for the one or more documents representative of at least one of the concepts,
performing data clustering for the one or more documents based on the answer data,
applying a data discovery process to the answer data to determine one or more labels relevant to the one or more concepts associated with the one or more documents,
generating an output report based on the answer data, and
deriving supplemental data relevant to at least some of the answer data.

21. The system of claim 20, wherein the controller is further configured to:
determine additional queries based on at least some of the answer data; and
perform an additional question-and-answer search for the one or more documents using the additional queries.

22. The system of claim 21, wherein the controller configured to determine the additional queries is configured to:
determine, using one or more ontologies defining relationships and associations between a concept identified from the at least some of the answer data, and different other concepts; and
derive additional questions for the additional queries based on the different other concepts determined using the one or more ontologies.

23. The system of claim 20, wherein the controller configured to obtain the query set is configured to:
adjust a pre-determined set of questions based on user information associated with a user, the user information comprising one or more of: personal preferences of the user, network access control associated with the user, or network groups the user is associated with.

24. The system of claim 20 wherein deriving the structured output information further includes determining that one or more of the documents is related to one or more of the plurality of the different content subject matter areas based on the determined scores for the answer data produced in relation to questions, from the plurality of questions, relating to the one or more the plurality of the different content subject matter areas.

25. A non-transitory computer readable media programmed with instructions, executable on one or more processors of a computing system, to:
receive one or more source documents;
convert the one or more source documents into one or more documents on which a question-and-answer (Q-A) search can be performed;
obtain a query set including a universal set of a plurality of questions relating to a plurality of different content subject matter areas;
perform a question-and-answer (Q-A) search on one or more documents using the query set to produce answer data responsive to one or more questions included in the query set, wherein the answer data characterizes concepts associated with the one or more documents;
determine scores for the answer data produced in response to performing the question-and-answer search using the query set; and
derive structured output information for the one or more documents based on the answer data produced in response to performing the Q-A search and the determined scores for the answer data, the deriving including determining that one or more of the documents is unrelated to one or more of the plurality of the different content subject matter areas based on the determined scores for the answer data produced in relation to questions, from the plurality of questions, relating to the one or more the plurality of the different content subject matter areas and one or more of:
determining classification information for the one or more documents representative of at least one of the concepts,
performing data clustering for the one or more documents based on the answer data,
applying a data discovery process to the answer data to determine one or more labels relevant to the one or more concepts associated with the one or more documents,
generating an output report based on the answer data, and
deriving supplemental data relevant to at least some of the answer data.

26. The non-transitory computer readable media of claim 25 wherein deriving the structured output information further includes determining that one or more of the documents is related to one or more of the plurality of the different content subject matter areas based on the determined scores for the answer data produced in relation to questions, from the plurality of questions, relating to the one or more the plurality of the different content subject matter areas.

* * * * *